(12) United States Patent
Koski

(10) Patent No.: US 7,792,136 B2
(45) Date of Patent: *Sep. 7, 2010

(54) CARRIER SENSE MULTIPLE ACCESS (CSMA) FOR NON-PACKETIZED WIRELESS DIGITAL VOICE NETWORKS USING INTELLIGENT CONVERSATION BOUNDARY DETECTION

(75) Inventor: Eric Koski, Fairport, NY (US)

(73) Assignee: Harris Corporation, Melbourne, FL (US)

( * ) Notice: Subject to any disclaimer, the term of this patent is extended or adjusted under 35 U.S.C. 154(b) by 455 days.

This patent is subject to a terminal disclaimer.

(21) Appl. No.: 11/669,191

(22) Filed: Jan. 31, 2007

(65) Prior Publication Data

US 2008/0181250 A1   Jul. 31, 2008

(51) Int. Cl.
*H04L 12/413*   (2006.01)
(52) U.S. Cl. .................. 370/445; 370/431; 455/517; 455/518; 455/519; 455/520
(58) Field of Classification Search ............... 370/431, 370/445; 455/518, 519, 520, 517
See application file for complete search history.

(56) References Cited

U.S. PATENT DOCUMENTS

| | | | | |
|---|---|---|---|---|
| 4,719,617 | A * | 1/1988 | Yanosy et al. ............... | 370/438 |
| 5,054,061 | A * | 10/1991 | Yoshida .................. | 379/390.01 |
| 5,706,274 | A * | 1/1998 | Angelico et al. ............. | 370/445 |
| 5,726,984 | A * | 3/1998 | Kubler et al. ............... | 370/349 |
| 5,729,542 | A | 3/1998 | Dupont ....................... | 370/346 |
| 5,752,193 | A | 5/1998 | Scholefield et al. ......... | 455/452 |
| 5,862,452 | A | 1/1999 | Cudak et al. ................. | 455/6.3 |
| 6,236,662 | B1 | 5/2001 | Reilly ......................... | 370/462 |
| 7,027,462 | B2 | 4/2006 | Benveniste ................. | 370/447 |
| 7,292,564 | B2 * | 11/2007 | Ekstrom et al. ............. | 370/350 |
| 7,313,103 | B2 * | 12/2007 | Cox et al. .................... | 370/285 |
| 7,451,084 | B2 * | 11/2008 | Funakura .................... | 704/235 |
| 2002/0039895 | A1 * | 4/2002 | Ross et al. .................. | 455/414 |
| 2007/0281617 | A1 * | 12/2007 | Meylan et al. ............. | 455/41.2 |

FOREIGN PATENT DOCUMENTS

KR   2002-0055535   7/2002

OTHER PUBLICATIONS

"Multiaccess Protocols in Packet Communication Systems" IEEE Transactions on Communications, vol. COM-28, No. 4, Apr. 1980.*

Takagi et al., "*Throughput Analysis for Persistent CSMA Systems*," IEEE Transactions on Communications, vol. COM-33, No. 7, Jul. 1985, pp. 627-638.

(Continued)

*Primary Examiner*—William Trost, IV
*Assistant Examiner*—Siming Liu
(74) *Attorney, Agent, or Firm*—Allen, Dyer, Doppelt, Milbrath & Gilchrist, P.A.

(57) ABSTRACT

A communications system includes a plurality of radios that form a carrier sense multiple access (CSMA) wireless communications network and communicate non-packetized digital voice with each other. Each radio is operative for dividing the period following the end of a transmission into a sequence of time slots and determining whether an end of a conversation has occurred. If an end of a conversation has occurred, the system decides randomly or pseudo-randomly with probability p to start transmitting on the channel in that slot.

32 Claims, 14 Drawing Sheets

OTHER PUBLICATIONS

Kleinrock et al., "*Packet Switching in Radio Channels: Part I—Carrier Sense Multiple-Access Modes and Their Throughput-Delay Characteristics,*" IEEE Transactions on Communications, vol. COM-23, No. 12, Dec. 1975, pp. 1400-1416.

Bruno et al., "*Optimization of Efficiency and Energy Consumption in p-Persistent CSMA-Based Wireless LANs,*" IEEE Transactions on Mobile Computing, vol. 1, No. 1, Jan. 1, 2002, pp. 10-31.

Hwang et al., "*Opportunistic p-Persistent CSMA in Wireless Networks,*" IEEE International Conference, 2006, pp. 183-188.

* cited by examiner

CARRIER SENSE MULTIPLE ACCESS (CSMA) FOR NON-PACKETIZED WIRELESS DIGITAL VOICE NETWORKS USING INTELLIGENT CONVERSATION BOUNDARY DETECTION

FIELD OF THE INVENTION

The present invention relates to communications systems, and more particularly, this invention relates to CSMA communications systems.

BACKGROUND OF THE INVENTION

Carrier Sense Multiple Access (CSMA) is often used in communications and is a typical probabilistic Media Access Control (MAC) protocol where nodes verify the absence of other traffic before transmitting on a shared physical medium, for example, a wired network or a radio frequency (RF) spectrum. The term "carrier sense" refers to a node's listening on a communications medium for a carrier wave or other distinctive feature of a transmitted signal in order to detect the presence of a prior transmission from another node on the shared medium, before attempting to transmit a signal on the same shared medium. If a prior transmission is detected, the node waits for the prior transmission to finish before initiating its own transmission. The term "multiple access" refers to the multiple nodes that send and receive on the transmission medium. Transmissions by one node can generally be received by other nodes using the medium.

In p-persistent CSMA, the letter "p" refers to the probability that a node having communications traffic to send will start transmitting in a specific period of time following the end of a received prior transmission. This is also referred to as the transmission probability, with values ranging from 0 to 1. A system in which a node having traffic to send always starts transmitting immediately once the prior transmission ends is an instance of 1-persistent CSMA, indicating there is a 100% chance that an immediate transmission will take place when a channel becomes idle. Waiting a random time before transmitting represents p-persistent CSMA, which is intended to reduce the probability of transmission collisions by giving different nodes different times at which they are permitted to start transmitting based on the transmission probability "p". Each node with traffic to send waits a random or pseudo-random time before starting to transmit. The statistical distribution of the wait times is determined by the value of the transmission probability. As each node waits, it monitors the channel. If it detects the start of another node's transmission before its own transmission time arrives, it cancels or reschedules its own transmission so as to prevent the collision of multiple transmissions on the shared medium that would otherwise occur.

Some wireless digital communications media, for example high frequency (HF) communications systems require substantial Forward Error Correction (FEC) coding and interleaving to provide adequate digital voice communications reliability. Use of these encoding and interleaving techniques results in significant end-to-end delivery latency, which creates a severe vulnerability to transmission collisions, greatly reducing network traffic capacity in single-frequency networks. Many users rely on single-frequency communications because of their all-informed character, which means that any network member can hear any other network member's transmissions. However, single-frequency communications networks have been found to suffer from severely limited capacity due to frequent traffic collisions when their delivery latencies are relatively large.

In packetized digital voice communications, a voice signal to be communicated to one or more recipients is first converted into a sequence of digital data whose length is determined by the time duration of the signal. The digital data sequence is then divided into data packets of up to a fixed maximum length determined by the digital data network by which the data packets are to be delivered. For instance, in Voice Over IP (VoIP), the maximum sizes of the IP packets in which the digital voice data are contained is determined by the Maximum Transmission Unit (MTU) sizes of the data network and its component subnetworks. The division of the digital data sequence into packets adds significant overhead, but this overhead can be tolerated in these systems because the communications bandwidth (channel capacity) of the digital data network is much larger than the data rate of the digital voice data. The underlying digital data networks used to deliver the digital voice data in packetized digital voice communications use a wide variety of communications techniques, including some forms of p-persistent CSMA.

In non-packetized digital voice communications, the digital data sequence representing the voice signal is transmitted over the physical communications medium as a single unbroken sequence of modulated digital data instead of being broken into multiple packets. This is typically necessary because the communications channel capacity is not significantly greater than the digital voice data rate, so that the additional overhead that would result from dividing the digital voice data into multiple packets cannot be tolerated. Military and public safety radio systems frequently employ non-packetized digital voice communications because of the limited communications bandwidths available to these systems.

Designers of non-packetized digital voice communications systems are aware of the desirability of limiting end-to-end latency. In doing so, however, many system designers are motivated by a concern about system responsiveness and user acceptance, and not about network capacity. Some systems, such as the APCO Project 25 Land Mobile Radio system, attempt to detect incoming voice signaling as early as possible, to avoid potential collisions. It has been found, however, that network capacity achievable in this way is limited to approximately 54%, as in 1-persistent CSMA. Any transmission overhead reduces the effective network capacity to below 54%.

In commonly assigned U.S. patent application Ser. No. 11/457,191, filed Jul. 13, 2006, the disclosure of which is hereby incorporated by reference in its entirety, a p-persistent CSMA protocol is applied to voice communications networks. An explicit random "dead time" can follow each received transmission where the receiving radio can implement a precisely time-slotted "persistence delay" scheme. The user wishing to transmit immediately following a channel-busy period is allowed to do so typically starting in a randomly-chosen time slot. The operator can press and hold the key switch to transmit and the radio can commence transmission once the chosen time slot is reached, or the radio can abort the transmission and process an incoming transmission if one arrives earlier than the chosen time slot. The slot duration should be at least equal to the effective latency plus the maximum propagation time, to permit a transmission commenced in slot n to be detected prior to the start of slot n+1.

This system can be considered an application of a slotted p-persistent CSMA protocol in which the time following the end of a received transmission is divided into a sequence of time slots of duration at least equal to the effective traffic detection latency a. In each slot, if it has not detected a new transmission on a channel, each station with new traffic begins to transmit with probability p. This has some increased overhead due to channel idle time, which may not be required if the load is low and the collision probability is low for some other reason.

In this system, p-persistence is applied following every voice transmission, but as a result, the achievable improvement in network capacity is often limited. It would be advantageous if p-persistence is applied typically in situations in which channel contention is likely to occur, but not applied at other times when its application would waste channel capacity.

SUMMARY OF THE INVENTION

A communications system includes a plurality of radio systems that form a carrier sense multiple access (CSMA) wireless communications network and communicate non-packetized digital voice with each other. At least one of the radio systems is operative for inferring whether collisions are likely based on patterns in a temporal sequence of past transmission on a communications channel. Each radio system is operative for monitoring the succession of transmissions on the communications channel, including its own transmissions and the transmissions of other radios, so as to determine when one of its own transmissions is the start of a new two-way voice conversation.

Each radio system is also operative for dividing the period following the end of a transmission it receives into a sequence of time slots. A slot in the sequence of slots can have a duration at least equal to an effective end-to-end traffic latency, which includes some or all of transmit latency, maximum propagation time, and latency of traffic detection by a receiver, so as to permit a transmission commenced in slot N to be detected prior to a start of slot N+1.

If an operator attempts to initiate a voice transmission (e.g., by pressing a key switch) either before or shortly after the end of a received transmission, the radio system determines whether the new transmission being initiated would be a continuation of a currently ongoing two-way voice conversation, or the start of a new conversation.

If the radio system determines that the new transmission being initiated would be a continuation of a currently ongoing voice conversation, the radio system begins to transmit as soon as is practical following the end of the received transmission.

If the radio system determines that the new transmission being initiated would be the start of a new two-way voice conversation, the radio system decides randomly or pseudo-randomly with probability p whether to commence transmission in each slot of the sequence of time slots following the end of the received transmission.

If the radio system detects a transmission by another radio system in one of the time slots before it commences its own transmission, the radio system processes the incoming transmission and blocks the outgoing transmission so as to prevent a collision between its own and the other radio system's transmissions.

In one non-limiting aspect, a radio system determines its own transmission to be the start of a new voice conversation whenever a sufficient time (a 'channel idle timeout period') elapses after the end of the last received transmission, and before the radio system operator attempts to initiate a new outgoing transmission.

In another non-limiting aspect, when a radio system determines that its own transmission is the start of a new voice conversation, it adds a distinctive data tag to the digital voice transmission, signifying to radios receiving it that it is the start of a new voice conversation. If another radio system receives a transmission containing this tag, and its operator attempts to initiate a voice transmission following the tagged transmission, the receiving radio system permits the voice transmission to start as soon as is practical, rather than applying a probability p less than one to each time slot to determine whether it can commence transmitting in that slot.

In another non-limiting aspect, a radio system determines that its next transmission is a continuation of a currently ongoing voice conversation whenever it was the next-to-last radio system to transmit.

In another aspect, any radio system that transmitted next-to-last can wait until a channel is declared idle before initiating a conversation with a different radio system.

In yet another aspect, at least one of the radio systems can adapt the aforementioned probability p based on one or more of at least traffic loading, number of stations, priority of traffic and durations of past transmissions. The slot transmission probabilities p for successive transmission time slots can be adjusted to compensate for probability distribution of key switch actuation over time.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

Different embodiments will now be described more fully hereinafter with reference to the accompanying drawings, in which preferred embodiments are shown. Many different forms can be set forth and described embodiments should not be construed as limited to the embodiments set forth herein. Rather, these embodiments are provided so that this disclosure will be thorough and complete, and will fully convey the scope to those skilled in the art.

The system and method in accordance with a non-limiting example of the present invention overcomes the problem when p-persistence is applied following every voice transmission. The system and method now allows p-persistence to be applied in situations in which channel contention occurs, but is not applied when the application of p-persistence is unnecessary and would waste channel capacity.

In the design of some radio systems, designers are typically aware of the requirement to limit end-to-end latency. This could be motivated by concern about system responsiveness and user acceptance, and not because of network capacity. Some radio systems attempt to detect incoming voice signaling as early as possible to avoid potential collisions. Examples of such systems are the ANDVT ECP-60 and APCO P25 systems. Network capacity achievable in this matter is limited to approximately 54% with a 1-persistent CSMA system. Any transmission overhead reduces the effective network capacity to below 54%. The copending and incorporated by reference patent application describes the application of p-persistent CSMA to non-packetized digital voice networks to improve the achievable network capacity to values greater than 54%.

To maximize the capacity improvement realized through application of p-persistence, it is desirable to apply the technique in situations in which channel contention is likely, but not in those situations where channel contention is unlikely. A data tag can be appended to a voice transmission to help identify situations in which application of p-persistence would be beneficial.

In accordance with a non-limiting example of the present invention, the system infers whether collisions are likely from patterns in a temporal sequence of past transmissions on a communications channel. It does this by means of intelligent conversation boundary detection: exploiting voice communication patterns to identify the ends of conversations and apply p-persistence exclusively or predominantly at these times.

As explained below, various additional techniques can be applied, including the adjusting of the slot transmission probability p to make the scheme more efficient.

Figure 13:
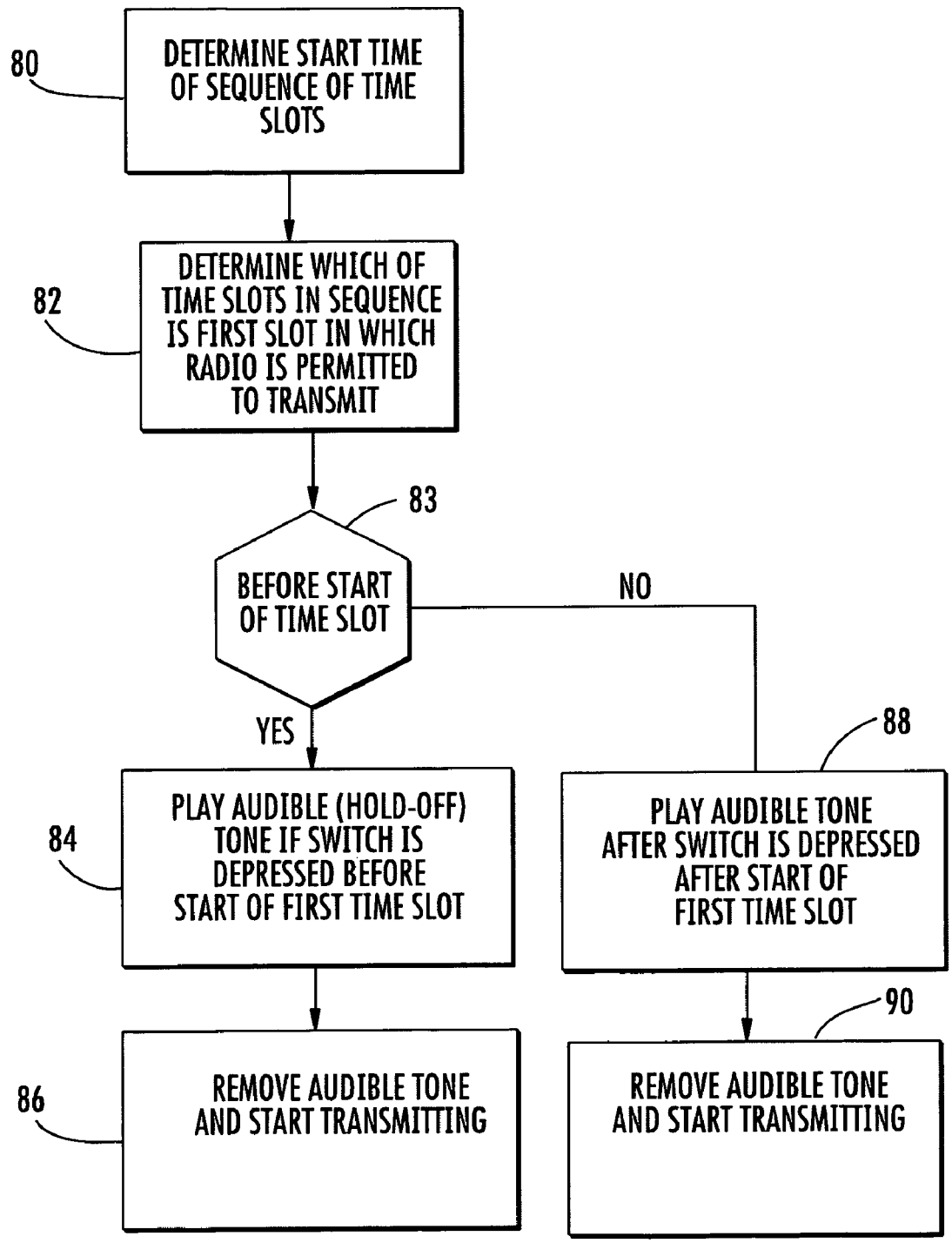
FIG. 13 is a high-level flowchart showing an example of the steps used in the sequence or flow for a p-persistent CSMA for non-packetized wireless digital voice networks.
Figure 14:
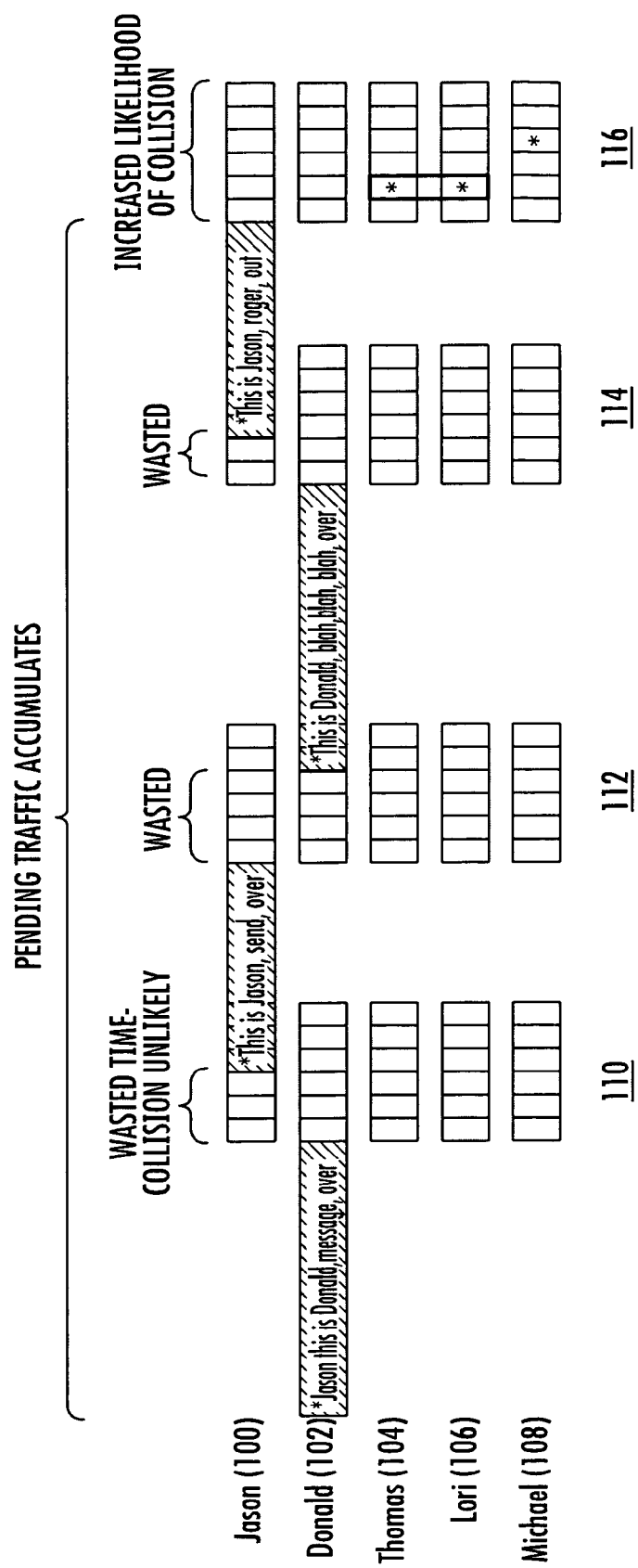
FIG. 14 is a diagram showing in the operation of a p-persistent system applied to voice communications, in which p-persistence is applied following every transmission.
Figure 15:
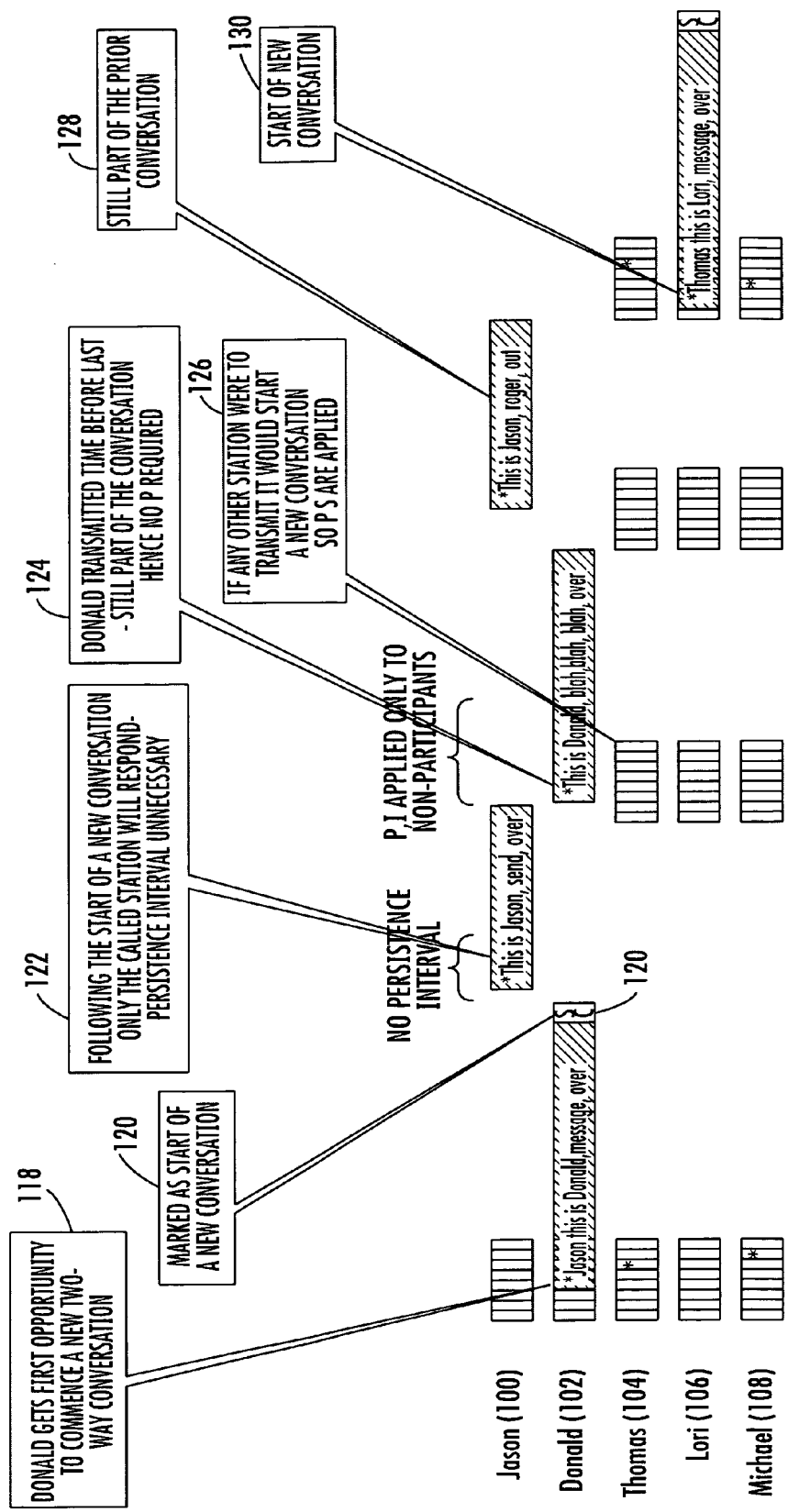
FIG. 15 is a diagram showing p-persistence and the use of intelligent conversation boundary detection in accordance with a non-limiting example of the present invention.
Figure 16:
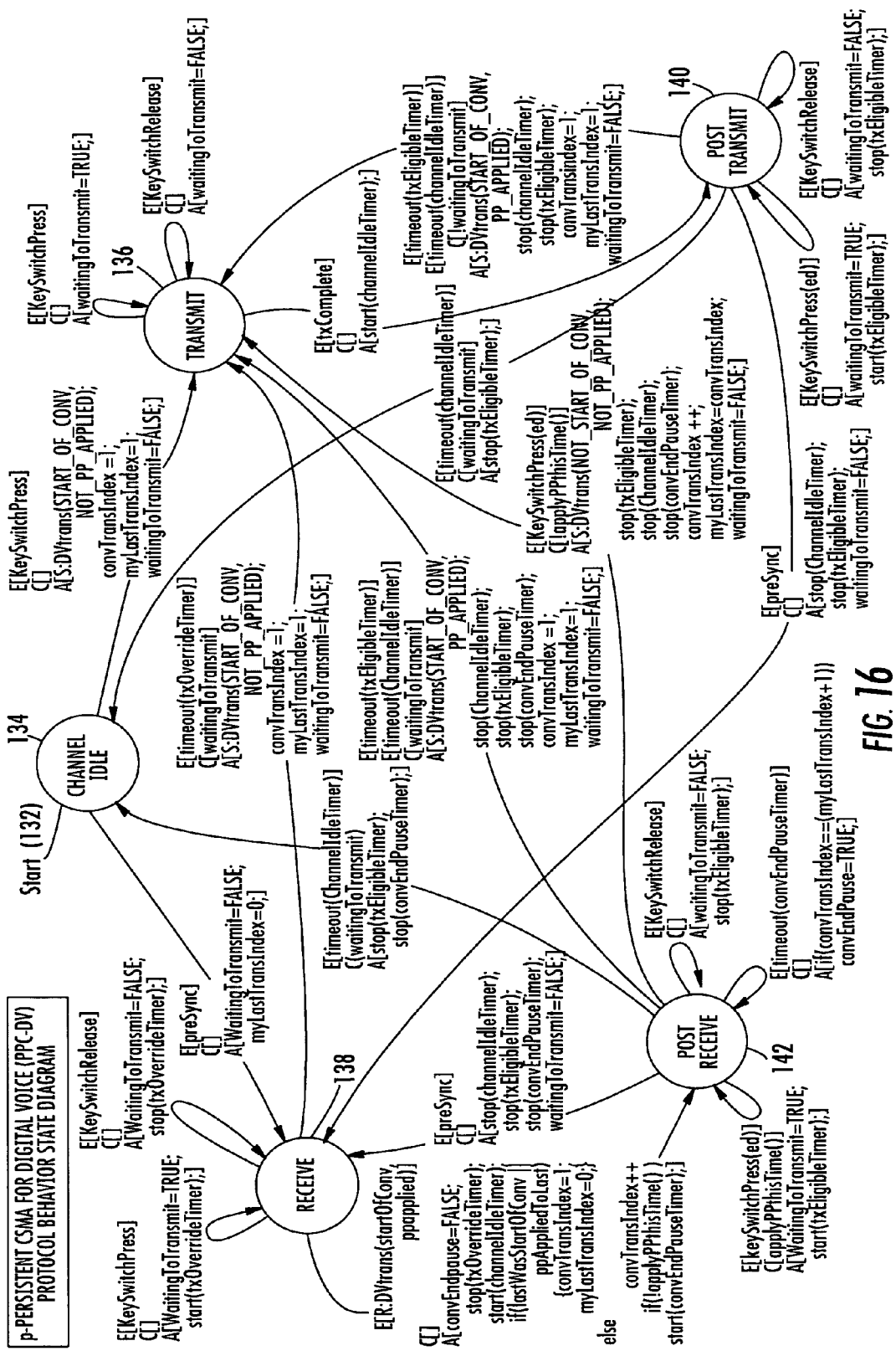
FIG. 16 is an example of a high-level model for a p-persistent CSMA network for digital voice that uses intelligent conversation boundary detection in accordance with a non-limiting example of the present invention.
Figure 17:
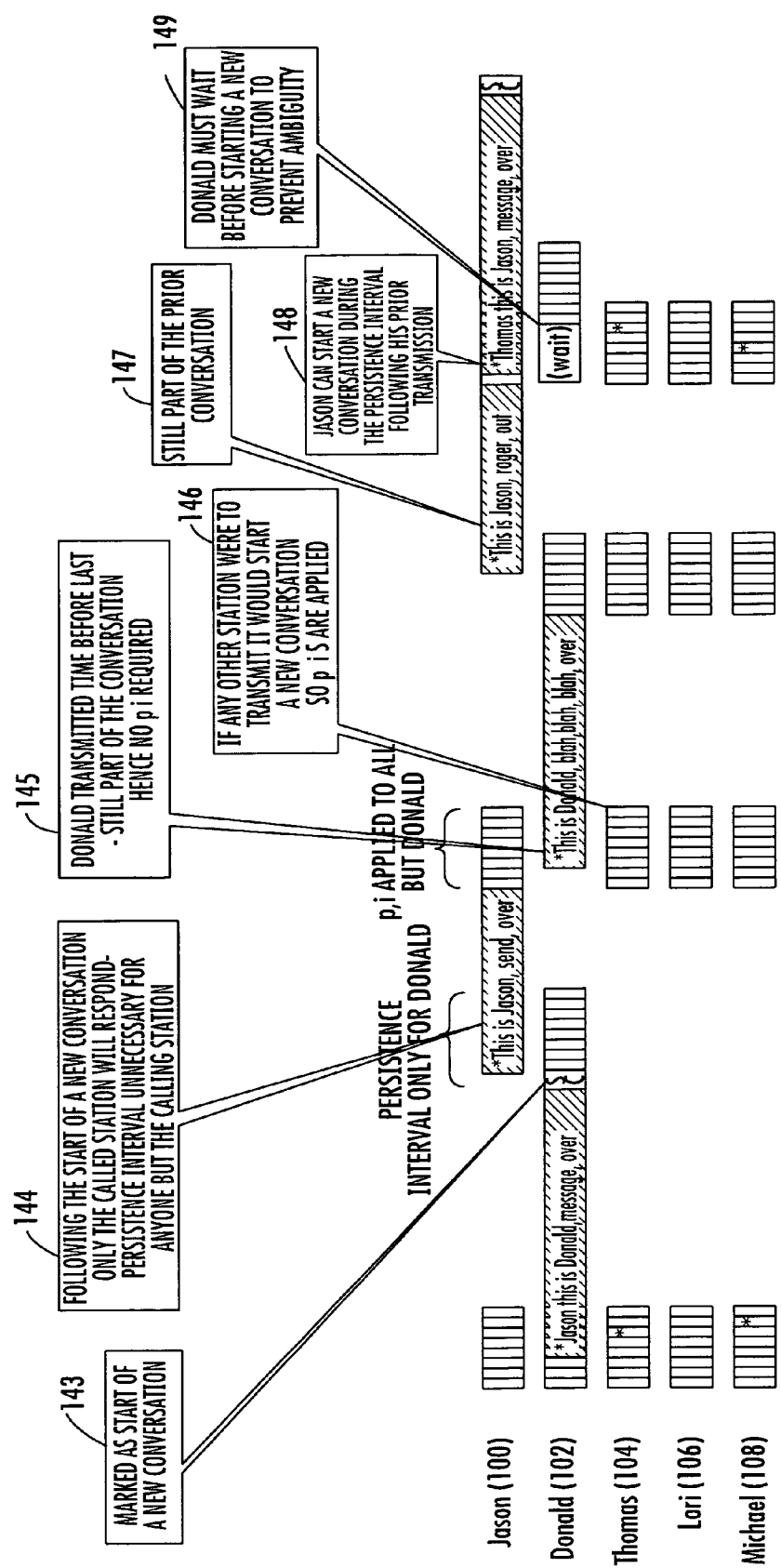
FIG. 17 is a diagram showing p-persistence and the use of an intelligent conversation boundary detection in accordance with another non-limiting example of the present invention.

There now follows a detailed description of a p-persistent CSMA protocol applied to voice communications networks relative to FIGS. 1-13 such as explained in the incorporated by reference '191 application identified above, followed by a detailed description of the p-persistent CSMA using intelligent conversation boundary detection relative to FIGS. 14-16 in accordance with a non-limiting example of the present invention. An example of a communications system that can be adapted for use with the system is shown in FIG. 17.

Figure 1:
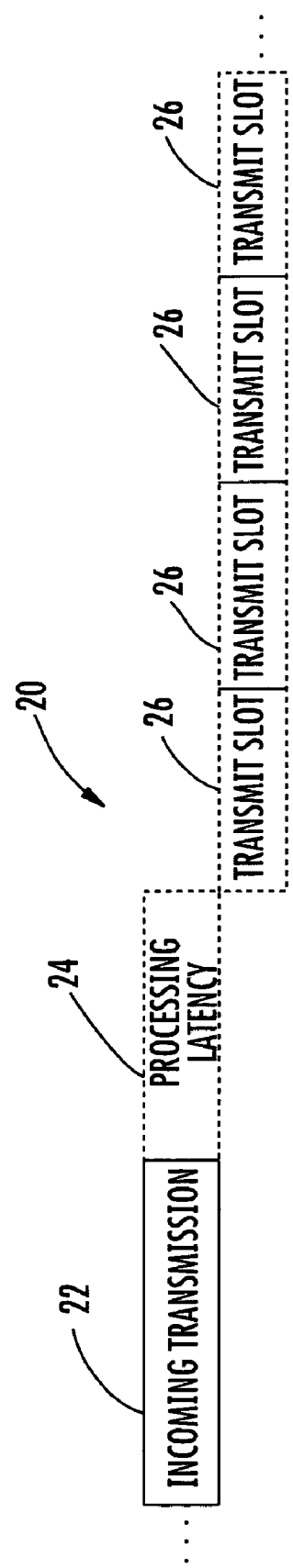
FIG. 1 is a fragmentary block diagram of a block transmitted frame showing an incoming transmission, processing latency, and transmission slots.

FIG. 1 is a high-level diagram of a communications transmission shown at 20, which includes an incoming transmission 22 and showing processing latency 24 and transmit slots 26. The figure depicts application of a p-persistent CSMA protocol to a voice communications network. A slotted p-persistent CSMA protocol has the time following the end of a received transmission divided into a sequence of time slots of duration at least equal to the effective traffic detection latency "a," to permit a transmission commenced in slot "n" to be detected prior to the start of slot "n+1."

In each slot, if the system has not detected a new transmission on the channel, each station with new traffic begins to transmit with probability "p." For example, a user wishing to transmit immediately following a channel-busy period is allowed to transmit only starting in a randomly-chosen time slot. The operator would press and hold the key switch to transmit. The radio either commences transmission once the chosen time slot is reached, or aborts the transmission and processes an incoming transmission if a transmission arrives earlier than the chosen time slot.

In this system, there could be an increased overhead due to channel idle time, which is not required if the offered load is low or collision probability is low for some other reason.

The system as described can exploit regularities in military voice communications operating procedures, for example, to apply p-persistence selectively to events constituting collision opportunities. For example, in military voice procedures, each voice message transmission is typically acknowledged. All operators can know that an acknowledgement is expected, and will wait to avoid colliding with it. Since this behavior of the operators will usually suffice to prevent collisions, it is possible in these situations to eliminate or reduce the "persistence wait" and avoid incurring overhead. After the acknowledgement is transmitted, a channel is "free to all comers," and a "persistence wait" can be used to prevent collisions. Adaptation of the transmission probability "p" can be based on traffic loading, the number of stations, the priority of traffic, or durations of past transmissions.

As is known to those skilled in the art, p-persistent CSMA is a common element of many packet data networks, which are often used for digital voice traffic. Time Division Multiple Access (TDMA) has also been a technique of choice to many skilled in the art for sharing a channel among multiple voice users.

It should be understood that secure non-packetized digital voice communication is and remains a dominant mode of use in many radio products, including military HF, VHF, UHF, and Tactical Satellite Communications (TACSATCOM) radio systems as well as public safety Land Mobile Radio (LMR) systems such as APCO Project 25.

An HF radio system can be a replacement for VHF Combat Net Radios (CNR's) in some applications. It can exploit increased range made possible by HF propagation characteristics, for example, ground wave and Near Vertical Incidence Skywave (NVIS). The system could be applicable to wireless single-channel media other than HF, wherever high-latency digital voice bearers are typically used.

It should be understood that HF systems have small bandwidth and unavoidable large latencies. This can also be true of other radio systems such as Project 25 (P25) and other Land Mobile Radio (LMR) systems.

Figure 2:
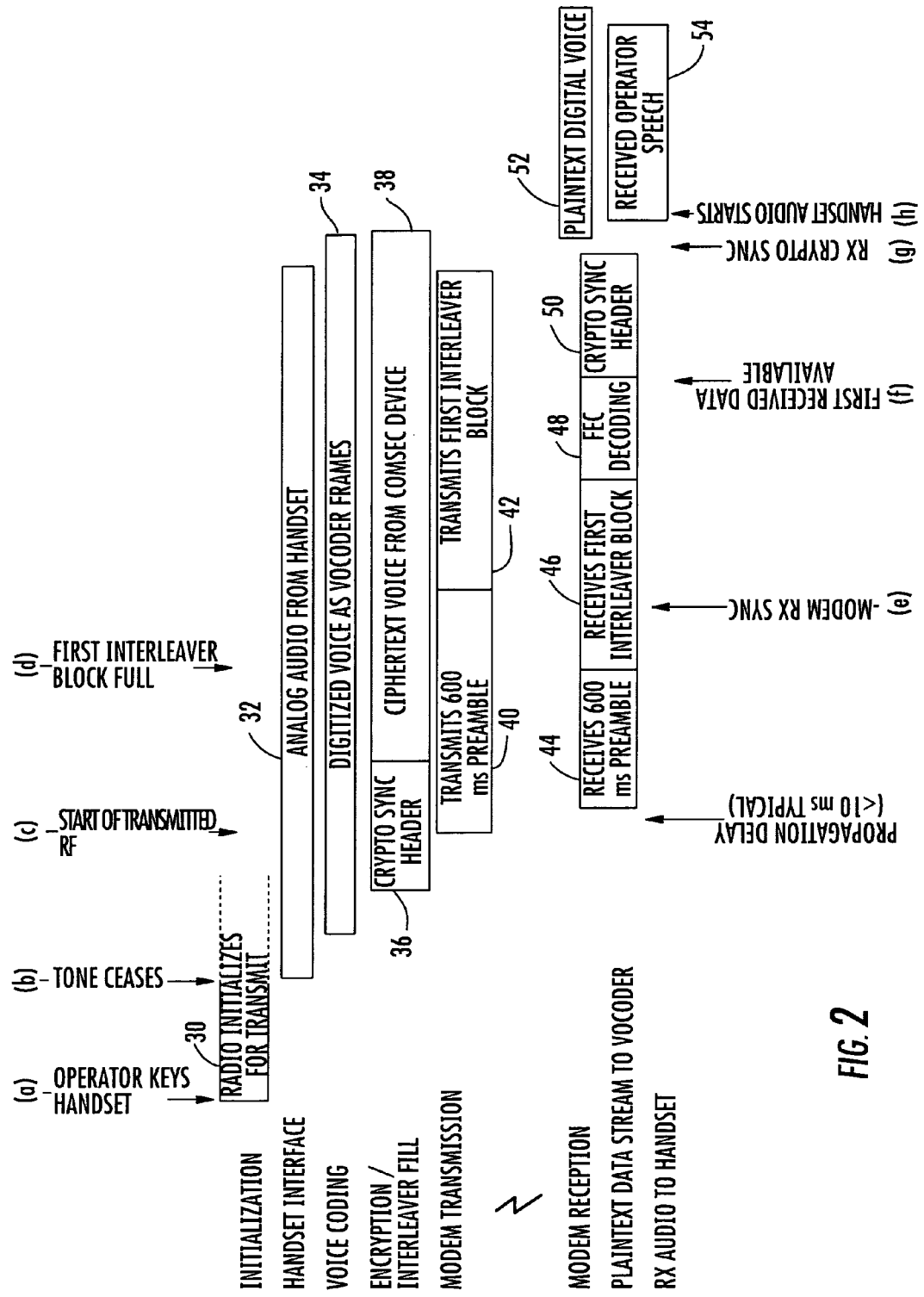
FIG. 2 is a block diagram showing an example of various elements that contribute to voice latency in communications systems.

FIG. 2 is a block diagram showing an example of elements of voice latency and the factors affecting it. Propagation delay could be less than 10 milliseconds for most "extended-range CNR" systems, but could be 80 milliseconds for long-haul skywave systems in which HF radios are commonly used. FIG. 2 shows basic initialization where the radio initializes for transmit (block 30). The handset interface is used to play a hold-off tone to the operator, and then is used to receive the analog audio signal to be transmitted. (block 32). Voice coding occurs, producing digitized voice in the form of vocoder frames (block 34). Encryption and interleaver fill occurs with a crypto sync header (block 36) and ciphertext voice data (block 38). A modem transmission occurs, for example, with transmission of a 600 millisecond preamble (block 40) followed by transmission of a first interleaver block (block 42). Modem reception occurs with a 600 millisecond preamble (block 44), receipt of a first interleaver block (block 46), a delay due to decoding of a Forward Error Correction (FEC) code (block 48) and receipt of a crypto sync header (block 50). The data stream to the vocoder contains plain text digital voice (block 52) and is provided to the receiver's handset audio interface as received operator speech (block 54). The different sequences at the top show an (a) operator keys handset, (b) hold-off tone ceases, (c) start of transmitted radio frequency (RF), and (d) first interleaver block full.

A receiver sequence at the bottom shows (e) modem receive sync, (f) first received data available, (g) received crypto sync, and (h) handset audio starts.

Figure 3:
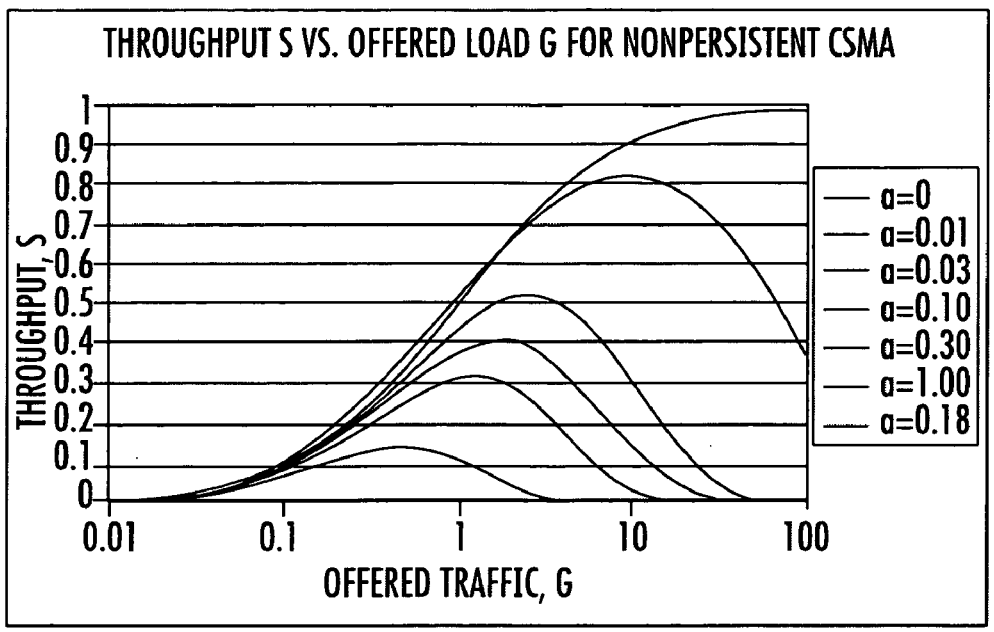
FIG. 3 is a graph showing an example of throughput for non-persistent CSMA.
Figure 4:
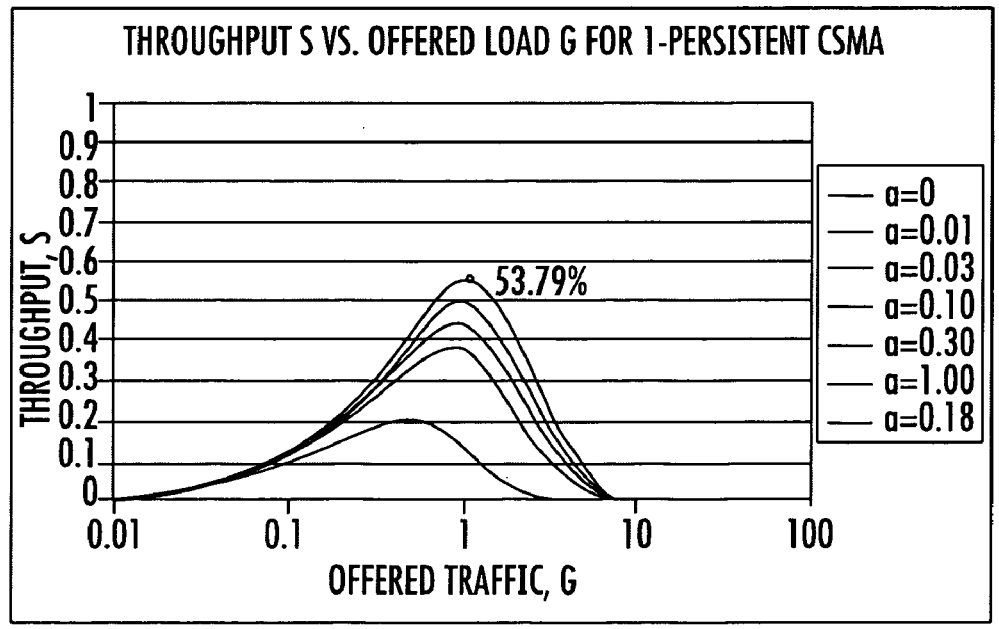
FIG. 4 is a graph showing an example of throughput for 1-persistent CSMA.

FIGS. 3 and 4 are graphs showing an analysis of a non-persistent (FIG. 3) versus a 1-persistent CSMA (FIG. 4). FIG. 3 shows the throughput "S" versus offered load "G" for non-persistent CSMA. The non-persistent CSMA achieves a high maximum throughput, but the "S" is low for realistic offered loads. FIG. 4 shows the 1-persistent CSMA that is more efficient up to G=1, but the throughput falls off rapidly thereafter. As shown in FIG. 4, the system suffers from frequent collisions once a channel becomes free following a transmission.

Figure 5:
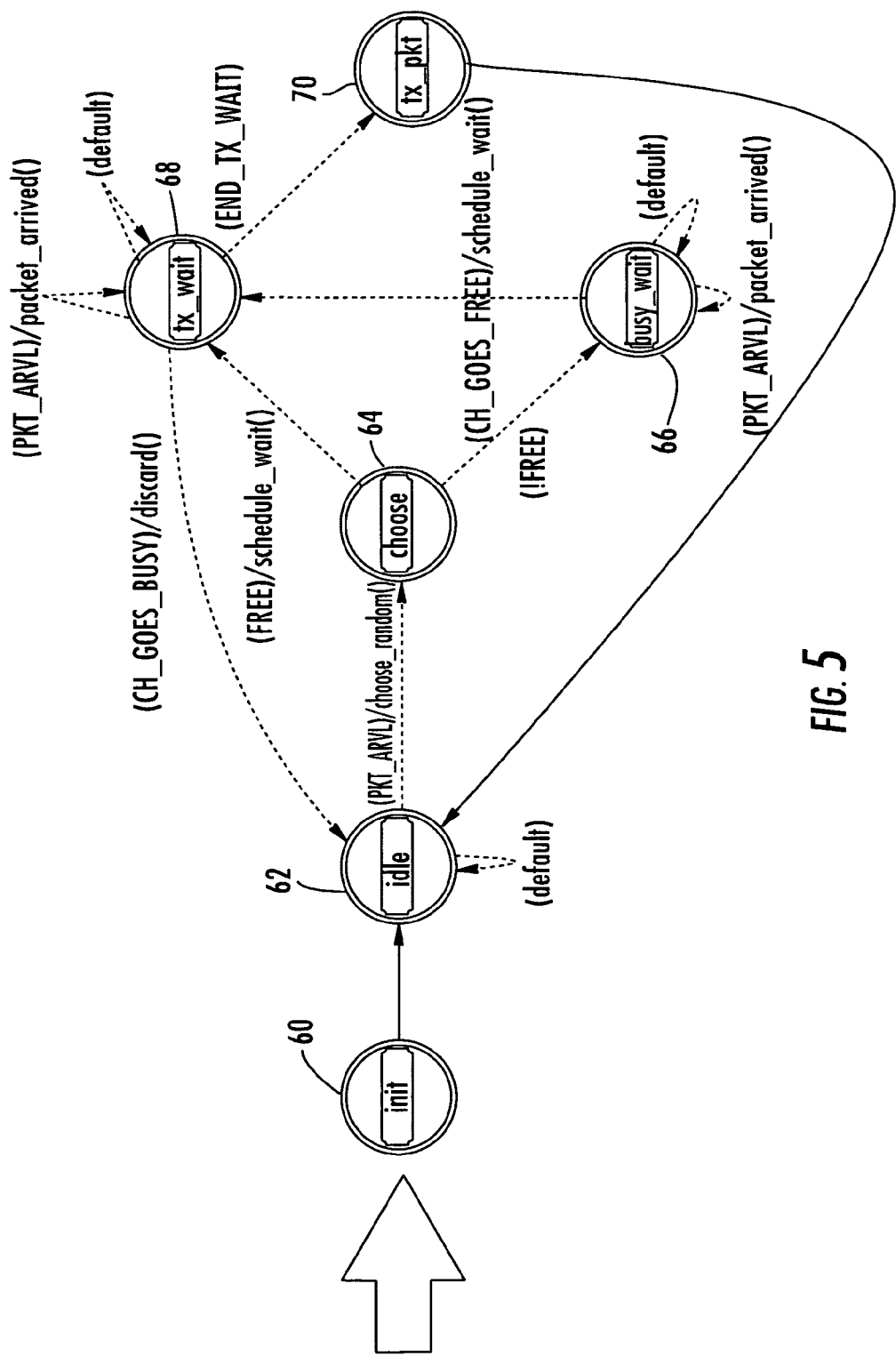
FIG. 5 is an example of a high-level model for a p-persistent CSMA network implemented using the OPNET Modeler communications network modeling and simulation environment and used to generate the performance data shown in FIGS. 6 through 12.

FIG. 5 is a high-level process model for a p-persistent CSMA OPNET simulation. As shown, the initialization state 60 is operative with an idle state 62. There is a choose state 64, busy_wait state 66, tx_pkt state 68, and tx_wait state 70 connected and operative as illustrated.

There now follows a more general description of the uses of the system as briefly described above, followed by greater details of the system, apparatus and method.

In recent years military forces have become more mobile to meet contemporary mission requirements, and are frequently required to cover much larger geographic areas. As a result, forces frequently outrun the transmission range of traditional VHF and URF line-of-sight communication systems. Similar issues can arise in non-military situations, for example, border security, drug interdiction, or natural disaster response. An emerging solution to these range problems is the use of HF radios for extended-range Combat Net Radio (CNR) and similar applications. HF signals have the ability to propagate to and over the horizon using either sky wave or ground wave modes. This unique ability has allowed HF radio to address the coverage gaps not served by VHF/UHF radio and other Beyond Line of Sight (BLOS) communications systems. A key issue that is addressed when designing and using an HF radio network for this purpose, however, is the network traffic capacity resulting from the delivery latency and transmission overhead of HF voice communications waveforms and techniques.

HF communications used for 'extended-range combat net radio' (CNR) communications and similar applications are likely to be subjected to relatively heavy voice traffic loads in networks containing larger numbers of users than are typically seen in HF long-haul applications. In these extended-range CNR applications, voice traffic capacity affects performance. This situation is complicated when users require 'all-informed' voice communications in which each net member hears transmissions by any other net member. The requirement for 'all-informed' communications precludes increasing network capacity by spreading the voice traffic across multiple frequencies, as would typically occur in networks using Automatic Link Establishment (ALE).

When standard HF data waveforms are used for digital voice communications, the resulting end-to-end voice latencies can be relatively large. These latencies result from design attributes of the MIL-STD-188-110B data waveforms giving them reliable performance on skywave channels. U.S. MIL-STD-188-110B, "Military Standard: Interoperability and Performance Standards for Data Modems," U.S. Department of Defense (2000) is hereby incorporated by reference in its entirety.

These waveform attributes include an initial preamble used for acquisition and synchronization, and the 600 ms short interleaver used at data rates of 75 to 2400 bps. These waveform attributes also create transmission overhead, for example, an amount by which the RF transmission on the channel exceeds in duration the voice audio payload being conveyed. The entire 600 ms preamble used in MIL-STD-188-110B short interleaving could result in an equal amount of overhead. Additional overhead, for example, about 300 ms as an average, results from the presence of an entire interleaver block at the end of a transmission, even if the final data bits only partially fill the last interleaver block. Still further overhead can result from other data included in the transmitted digital data stream.

HF voice communications networks can suffer from diminished capacity because of the increased latency and transmission overhead. Latency leads to transmission collisions in which two or more radios transmit simultaneously, frequently causing neither transmission to be received successfully. Networks containing relatively large numbers of users, e.g., 10 or more, with heavy traffic loads can suffer from frequent collisions between voice transmissions. When a collision occurs, the receiving radio's modem is typically captured by the first voice transmission to arrive. Any later transmission causes interference resulting in bit errors in the received data stream, leading to corruption of the received voice signal or, in secure communication modes, to loss of the entire incoming transmission if bit errors cause any crypto synchronization to fail.

The increased latency of the HF voice communications techniques is a principal factor responsible for the increased occurrence of collisions. For purposes of explanation, an HF voice network can be viewed as an example of a communications network using a CSMA (Carrier Sense Multiple Access) media access control (MAC) technique. Before transmitting, radio operators listen for traffic on the channel in order to avoid causing a collision by transmitting. Their listening to the channel fills the role of a 'carrier sense' mechanism in a CSMA system. As a result, an HF voice communications network could be properly called a 'hand-operated CSMA' system. Large end-to-end latencies such as can occur in an HF voice communications system limit the effectiveness of this manual 'listen-before-transmit' technique. The latency creates a time-window in which an operator's pressing the radio's key switch can cause a collision even though the operator has not yet heard (or has not recognized) an incoming transmission. It is desirable to reduce the end-to-end latency, preferably without changing the underlying voice coding or modem waveform in order not to forfeit performance advantages. It is desirable not to add additional voice coding techniques and waveforms, which could be expensive to procure and would complicate system operation and management. Fortunately, significant latency reductions are possible without changing the underlying voice coding and waveform.

The total latency from the key switch actuation to the receiving operator's hearing voice has both physical and human elements. The latency can be expressed as $t_{tx}+t_{prop}+t_{rx}+t_{sp}+t_{rt}$, where $t_{tx}$ represents the latency from the transmitting operator's keying the handset to the transmitting radio's beginning to emit RF energy. This can be determined by the properties of the waveform and voice coding, but primarily by the design of the transmitting radio. The $t_{prop}$ (propagation delay) could be less than 10 ms at most for the extended-range applications considered here, such as CNR in a non-limiting example. The $t_{rx}$ represents the latency from the arrival of RF energy at the receiving radio to the start of the audio signal played to the receiving radio's handset. This can be determined by the waveform, voice coding, and radio design. The $t_{sp}$ represents the latency from the removal of a hold-off tone in the transmitting operator's handset to an operator's beginning to speak. This human latency can be as much as 500 to 750 ms or more corresponding, for example, to a human reaction time. The $t_{rt}$ represents the latency from the arrival in the handset of the start of the transmitted operator speech, to the receiving operator's recognizing the speech so as to avoid transmitting and causing a collision. This is another human latency or 'reaction time' whose duration can be as much as 200 to 400 ms or more.

It is possible to reduce the total voice latency by providing an indication that the channel has become occupied based on some event occurring earlier in the receive process. Two events could be used, for example, crypto sync, which occurs when the receiving COMSEC device detects its synchronization preamble, and a modem preamble sync, which occurs when the receiving modem has processed the entire modem preamble. When the chosen event occurs, the system could attempt to reduce the likelihood of a collision by providing some sort of warning to the receiving operator that the channel is now busy. This could take the form of one of at least a visual indication and an audible signal. Also, the system could attempt to prevent a potential collision by prohibiting an operator from transmitting. When a receiving radio determines that a channel has become busy, for example, by detecting either of the two events identified above, it could ignore actuation of the handset key switch to prevent an operator from causing a collision. This could eliminate any possible human reaction time (required to recognize the visible or audible channel-busy indication) from the effective latency.

To understand the benefits and limitations of these approaches, a reasonably accurate and realistic model of an HF voice communications network from which performance estimates can be derived by one of at least mathematical analysis and simulation is now set forth.

As a first rough approximation, an HF voice network can be viewed as a 1-persistent CSMA system as noted in L. Kleinrock, F. A. Tobagi. "Packet Switching in Radio Channels: Part I—Carrier Sense Multiple-Access Modes and Their Throughput-Delay Characteristics," IEEE Transactions on Communications, Vol. COM-23 No. 12, pp. 1400-1416, (1975), the disclosure which is hereby incorporated by reference in its entirety. Kleinrock and Tobagi give a throughput analysis of 1-persistent CSMA, for a model system with infinitely many nodes. This type of analysis provides useful approximate throughput estimates for networks with 10 or more users.

Figure 6:
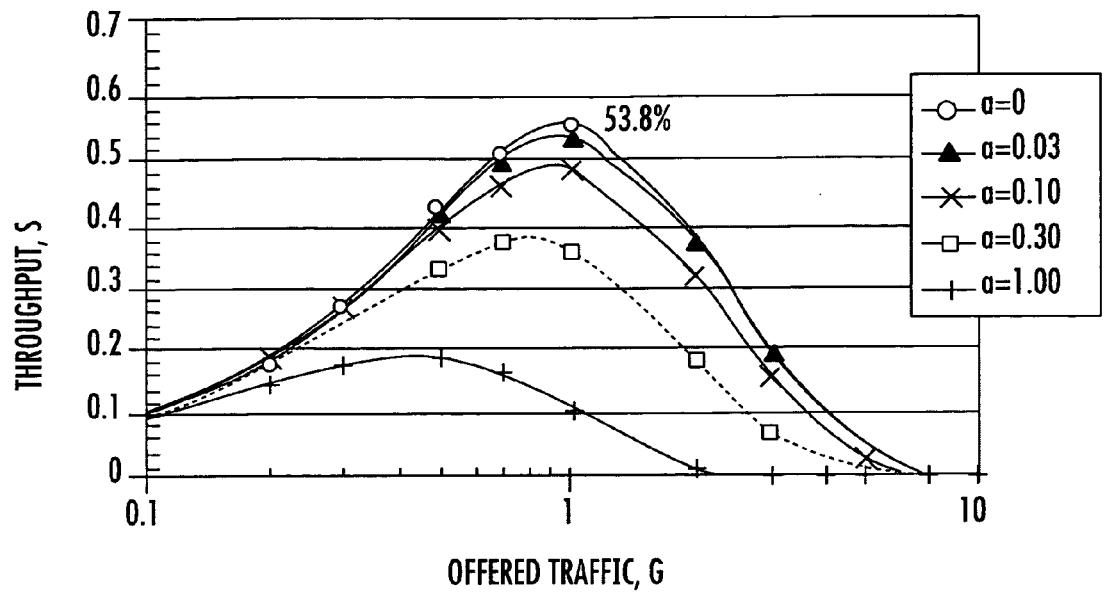
FIG. 6 is a graph showing the throughput "S" versus the offered load "G" for 1-persistent CSMA.

FIG. 6 is a graph showing network throughput "S" as a function of the offered load "G" for various values of end-to-end latency. In this example, it is normalized to a fraction of the transmission duration, which is assumed to be constant. "G" is the sum of the transmission durations of traffic arriving at all nodes, divided by total time. "S" is the sum of the durations of all successfully delivered traffic, divided by total time. A fully-loaded ideal network might have six ten-second voice messages arrive per minute for an offered load "G" or about 1.0, and deliver them all successfully for a throughput "S" of 1.0. Network throughput is substantially determined by the end-to-end latency. In the best case, with zero latency, throughput reaches a maximum of approximately 53.8%. For a transmission duration of about 10 seconds and a latency of about three seconds, the value of a latency normalized to a fraction of the transmission time is about 0.3, given a maximum network capacity of approximately 36.4% in this non-limiting example. The transmission overheads described above could reduce the effective network throughput by a further 10%, resulting in a maximum throughput of only about 32.7%.

Reducing the latency can yield a meaningful improvement in network capacity. The upper limit of 53.8% can be imposed by a 1-persistent CSMA model's assumption that, whenever a transmission is attempted while the channel is busy, the user waits until the channel becomes free and immediately thereafter starts to transmit. Whenever two or more transmissions are attempted during the same channel-busy period, they inevitably collide once the channel becomes free. This is not a completely accurate representation of radio operator behavior, however. There is some random time interval after the channel becomes free before an operator attempts to transmit. The difference between the times at which two users attempt to transmit could conceivably give the later of the two an opportunity to recognize the earlier one's transmission on the channel and avoid a collision. To address this possibility, the 1-persistent CSMA model is replaced with a p-persistent CSMA model.

One proposed model is by H. Takagi and L. Kleinrock, "Throughput Analysis for Persistent CSMA Systems," IEEE Transactions on Communications, Vol. COM-33, No. 7, pp. 627-638 (1985), the disclosure which is hereby incorporated by reference in its entirety. This model provides an analysis of the throughput of an unslotted p-persistent CSMA system. Their model formulation provides analysis results for systems containing finite numbers of nodes. The unslotted model is a more accurate reflection of the behavior of human operators than a slotted p-persistent model would be. The analysis formulas are not in closed form, however, making direct computation of the network performance estimates one might need difficult.

An OPNET simulation model of an unslotted p-persistent CSMA system conforms to their model definition and obtains excellent agreement with the throughput values as discussed below. In the description, l/p is the mean value of an exponentially-distributed 'persistence latency.' It is the time that elapses between the channel's becoming free and a waiting radio's starting to transmit, so that p=infinity gives the equivalent of a 1-persistent CSMA system.

Figure 7:
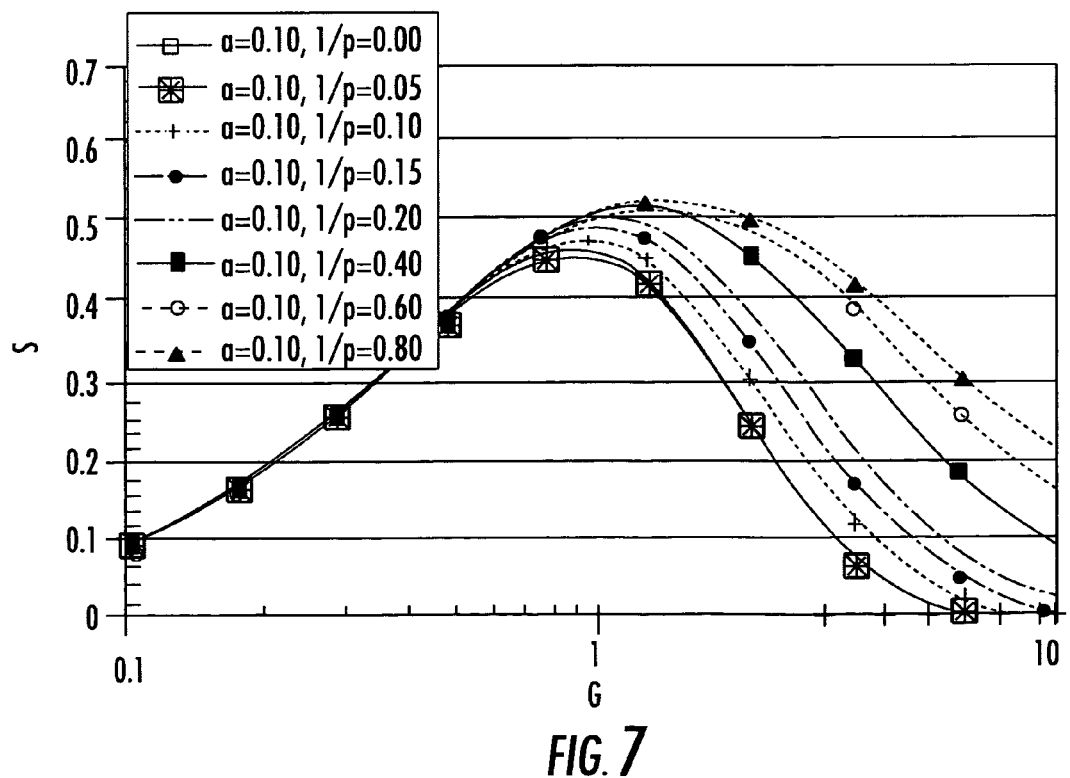
FIG. 7 is a graph showing unslotted p-persistent CSMA for 16 nodes.

FIG. 7 shows the impact of different values for 1/p on the throughput of a 16-user network with a=0.1. The addition of p-persistence provides a significant performance benefit only when the value of 1/p appreciably exceeds that of "a.". For p-persistence to prevent a collision after the channel becomes free, the difference in the times at which two users attempt to transmit must exceed the time required for the second user to detect the transmission by the first.

To make the OPNET simulation model a more accurate representation of a voice network of human operators, the exponential distribution of 'persistence latencies' can be replaced with a statistical distribution matching the observed behavior of human operators in laboratory measurements, which could be a random persistence latency with a mean of approximately 660 ms in this non-limiting example.

Figure 8:
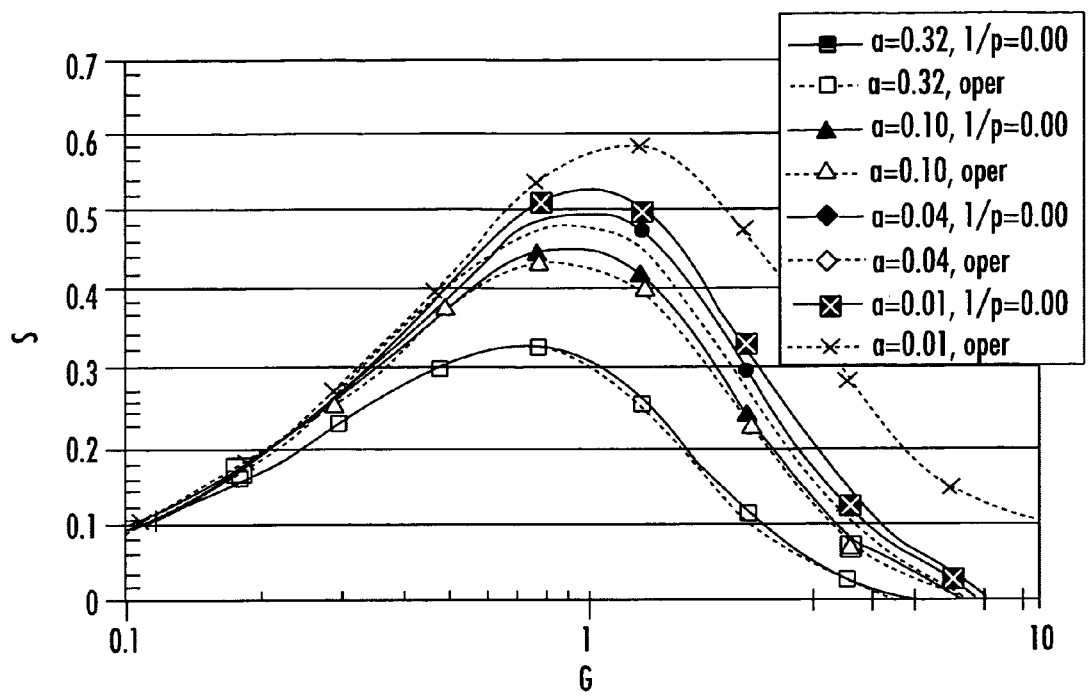
FIG. 8 is a graph showing the impact of "operator persistence" behavior.

FIG. 8 compares the levels of throughput obtained with a resulting model with those of 1-persistent CSMA for various values of "a." Series labeled "oper" in the graph legend refer to 'operator persistence' behavior based on observations and those labeled "1/p=0" in the graph legend refer to 1-persistent CSMA. For large or moderate values of "a," the 'operator persistence' behavior can reduce capacity. A random portion of an 'operator persistence' delay duration could be insufficient to reduce appreciably the likelihood of collision. As a result, the delay in transmitting after receiving adds overhead. However, 'operator persistence' could significantly reduce the frequency of post-channel busy collisions when the value of "a" becomes small, e.g., 0.02 or less, representing a latency reduction of more than 90% from an initial value of about three seconds.

A voice communications system could add an explicit random 'dead time' following each received transmission, which prevents some collisions among two or more users who initiate transmission attempts during a time in which the channel is busy. The receiving radio could implement a time-slotted 'persistence delay' scheme, increasing efficiency and preventing some collisions similar to the way that "Slotted Aloha" provides greatly increased throughput relative to "Unslotted Aloha."

A user wishing to transmit immediately following a channel-busy period would be allowed to transmit starting in a randomly-chosen time slot. The operator would press and hold the key switch to transmit. The radio would either commence transmission once the chosen time slot was reached, or abort the outgoing transmission and process an incoming transmission if one were to arrive earlier than the chosen time slot. The slot duration would have to be at least equal to the effective latency plus the maximum propagation time, to permit a transmission commenced in slot "n" to be detected prior to the start of slot "n+1." Such a scheme would be an application of the slotted p-persistent CSMA protocol. In this protocol, the time following the end of a received transmission is divided into a sequence of time slots of duration "a." In each slot, if it has not detected a new transmission on the channel, each station with new traffic begins to transmit with probability "p." Slotted p-persistent CSMA with a transmission probability "p=1" is equivalent to unslotted p-persistent CSMA with a mean persistence latency "1/p=0."

The end-to-end latency "a" could crucially determine the effectiveness of such a scheme. A smaller latency value would allow the slot duration to be small, permitting a smaller slot transmission probability "p" so as to more effectively prevent collisions, without excessively increasing the idle-time overhead resulting from idle slots prior to the start of a post-channel-busy transmission.

Capacity improvement could also be achieved by an 'explicit p-persistence' scheme for voice communications using a slotted p-persistence scheme.

Figure 9:
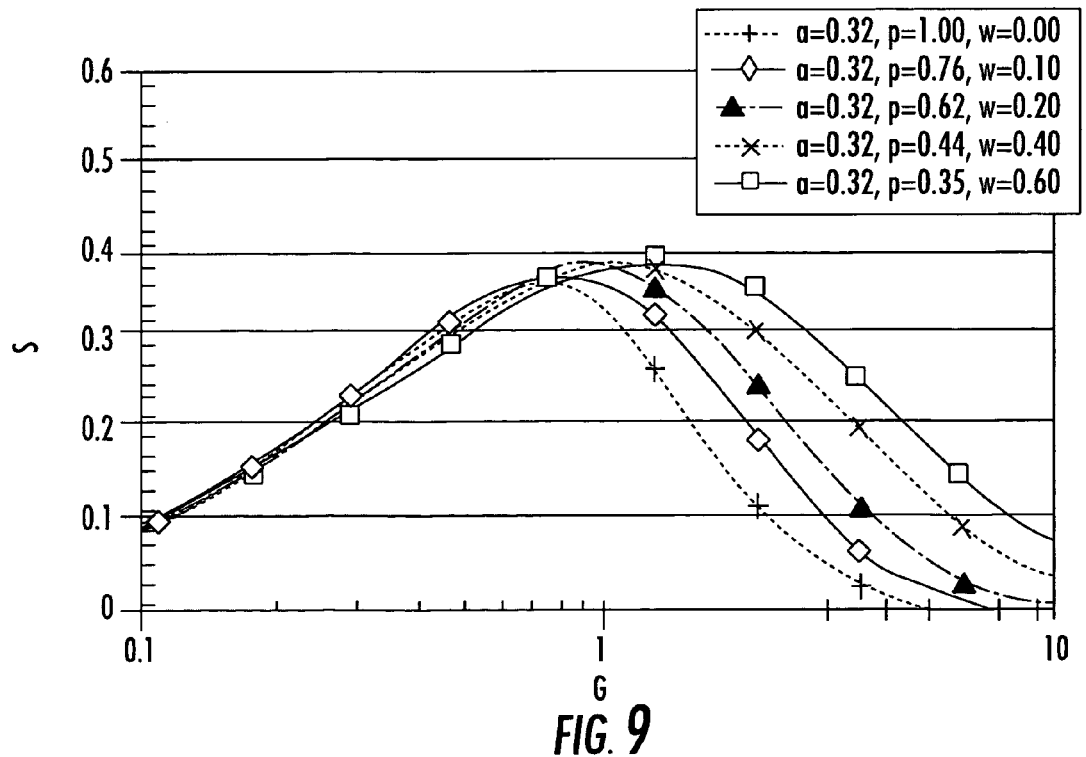
FIG. 9 is a graph showing slotted p-persistent CSMA with a large latency.

FIG. 9 is a graph showing throughput as a function of offered load for a 16-node network with a=0.32, corresponding to a 3.2 second latency with a fixed transmission duration of ten seconds, with a range of values of the transmission probability "p." For each "p" value, a corresponding value "w" represents the mean wait time once the channel becomes free for each transmission initiated during a channel-busy period. w=0.2 indicates that the mean wait time for each transmission is 0.2 times the transmission duration, or two seconds. In this case, the slot size must be large (>a). As a result, in order for the slot transmission probability "p" to be low enough to significantly reduce the frequency of collisions, the mean wait time "w" must be large enough to create a large amount of channel-idle time, reducing the throughput such that the addition of explicit p-persistence yields no significant increase in maximum throughput.

Figure 10:
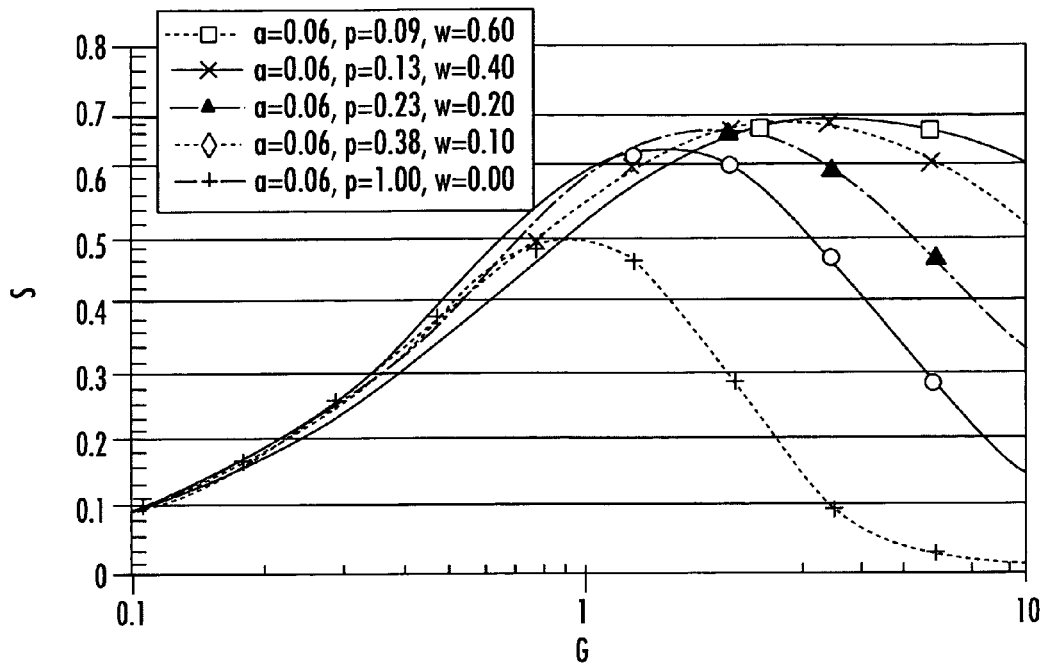
FIG. 10 is a graph showing a slotted p-persistent CSMA with reduced latency.

FIG. 10 is a graph showing throughput as a function of offered load for a similar network, but with a=0.06, representing a 600 ms latency. Even with no p-persistence (p=1.0), the reduced latency is beneficial, yielding a maximum throughput near 48%. Explicit p-persistence yields a further increase in throughput up to about 64% in this non-limiting example. The smallest "p" values corresponding to "w" values greater than 0.2 did not significantly increase maximum throughput, although they did increase throughput values for G>>1. This was achieved at the price of some reduction in throughput for G<1. For a variety of latency values "a," the fixed "p" values resulting in w=0.2 appeared to yield a near-optimal increase in maximum throughput, without significantly reducing throughput for G<1.

Figure 11:
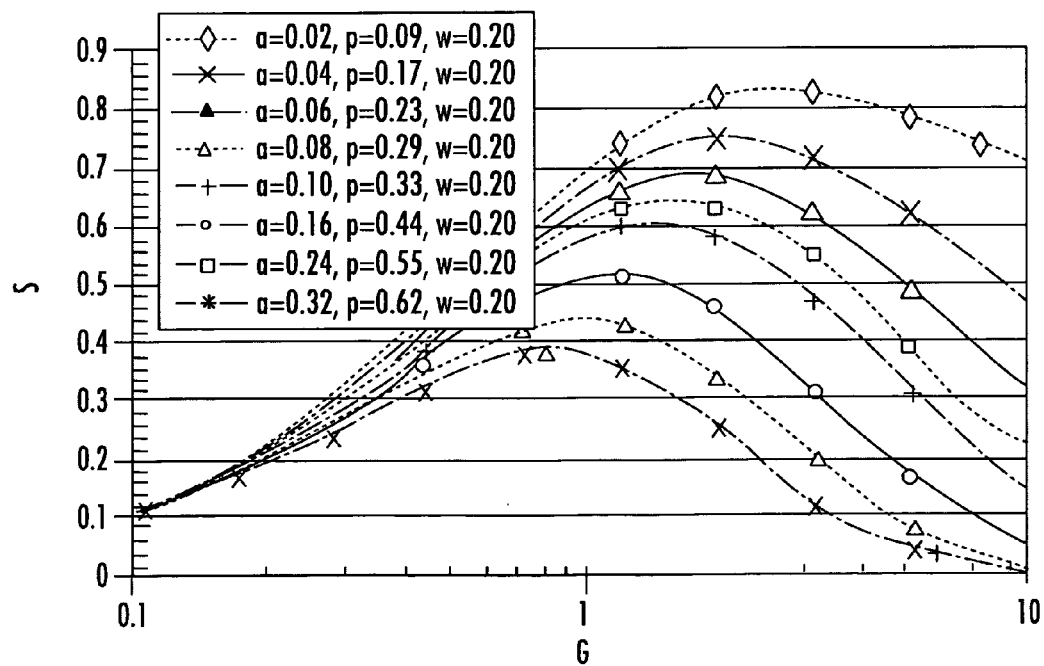
FIG. 11 is a graph showing the impact of latency reduction on capacity and slotted p-persistent CSMA.

FIG. 11 is a graph showing latency reduction and explicit p-persistence combined to substantially improve network capacity. With p=1.0, maximum capacity was limited to 53.8% even for a=0. Incorporating a mean 'persistence wait' of w=0.2 permits a maximum throughput approaching 80% to be achieved in this non-limiting example.

Figure 12:
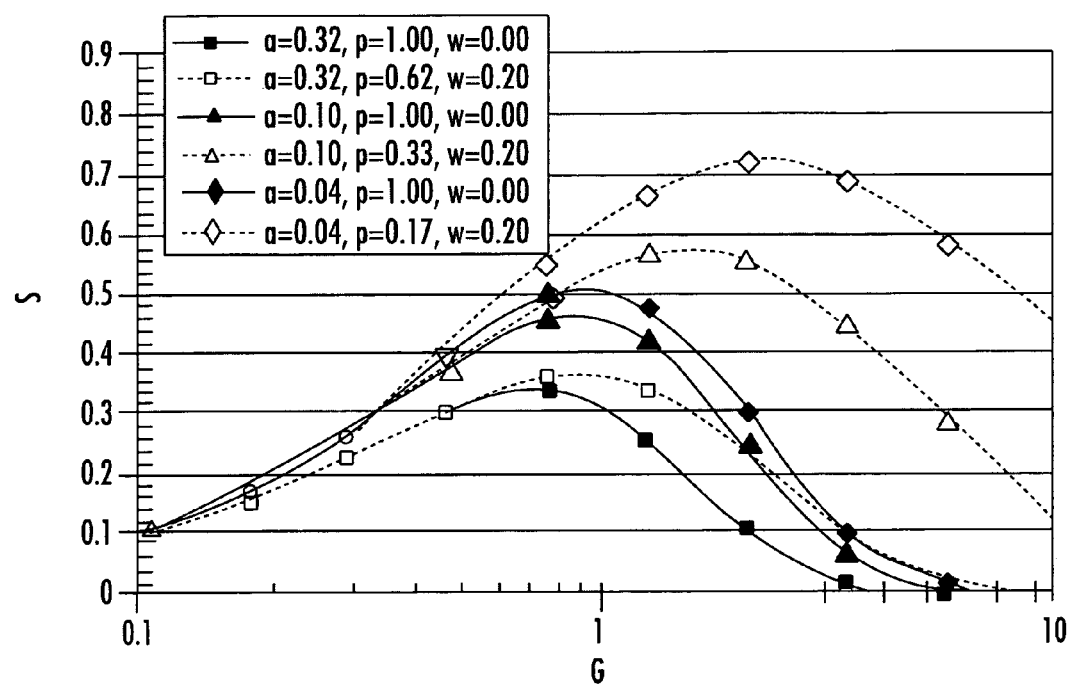
FIG. 12 is a graph showing the increase in capacity due to application of slotted p-persistent CSMA for different latency values.

FIG. 12 is a graph showing the increase in throughput attributable to explicit p-persistence for "a" values of 0.32, 0.1, and 0.04. The beneficial impact of explicit p-persistence increases markedly as latency is reduced below a=0.1. Even for a=0.1 however, the beneficial impact of adding explicit p-persistence is greater than that of reducing latency to as little as 0.04 without adding explicit p-persistence. The data presented in the graph of FIG. 12 suggest a possible course of action to improve the capacity of an HF extended range voice communications network such as CNR. From an initial latency near three seconds, a latency reduction to about one second, a=0.1, could be feasible when a MIL-STD-188-110B modem preamble is detected as early as possible, thus increasing network capacity to near 45%. Further latency reductions may diminish benefits because they do little to reduce the occurrence of post-channel-busy collisions. Adding 'explicit p-persistence, however, could increase network capacity to near 55%, and makes possible significant further capacity increases through further latency reduction.

HF communications systems used for extended-range radio applications are likely to be subjected to relatively heavy voice traffic loads in networks containing larger numbers of users than are typically seen in HF long-haul scenarios. In these extended-range radio applications, voice traffic capacity can be an important performance attribute. The communication techniques used in HF digital voice communications systems create large end-to-end voice latencies, which can frequently be on the order of three seconds or more. By modeling an HF voice communications network as a hand-operated CSMA system, this amount of latency can be seen to significantly reduce network capacity by increasing the frequency of voice traffic collisions. Reducing latency to one second or less would be likely to improve network capacity; however, the degree of improvement achieved in this way could be limited by the occurrence of collisions whenever two stations attempt to transmit following the end of a preceding transmission on the channel. The addition of an 'explicit p-persistence' scheme could be used to improve the capacity of an HF voice communications network when latency has been reduced to a sufficient degree. Once 'explicit p-persistence' is added, further latency reductions continue to yield improvements in capacity.

In one non-limiting example, the p-persistence selectively follows some but not all transmissions on the channel. Such an approach can use p-persistence to avoid collisions in situations in which they would otherwise be likely to occur and can avoid incurring unnecessary overhead in situations where collisions would be unlikely to occur.

The system apparatus and associated method can apply p-persistence to manual initiation of transmissions, by using p-persistence to determine the first transmission time slot in which a user is allowed to transmit, and forcing user transmissions to start at the beginning of a time slot.

Referring now to FIG. 13, there is shown a high-level flow chart giving an example of the sequence, i.e., the process flow, in accordance with non-limiting examples of the present invention. When a radio receives the end of an incoming voice transmission, it can determine the start time of a sequence of transmitted time slots, each having a duration greater than the time required for the start of a voice transmission to be initiated at the transmitting radio, which is propagated over the wireless communications medium and detected by the receiving radio (Block 80). All radios in the system can determine the same start time to within a small time difference resulting from different propagation delays. The radio can then use a pseudo-random computation to determine which of the slots in the sequence is the first slot in which the radio is permitted to transmit (Block 82). Usually, if more than one radio has voice traffic to transmit, different radios will select different slots. Of these radios, the single radio whose selected slot appears earliest in the sequence can transmit. Other radios have time to detect this radio's transmission before starting to transmit and, as a result, no collision occurs.

A determination is made whether a key switch, e.g., a transmitter switch has been depressed before the start of a time slot (Block 83). If a radio operator presses the key switch before the start of the slot in which the radio determines that it is allowed to transmit, the radio does not transmit immediately. Instead, it plays an audible signal, e.g., a 'hold-off tone', at the operator's handset, informing the operator that the radio must wait before transmitting (Block 84). Once the start of the time slot in which the radio is permitted to start transmitting arrives, the radio removes the 'hold-off tone' and starts transmitting (Block 86). If a radio operator presses the key switch after the start of the first time slot in which the radio is permitted to transmit, the radio plays the hold-off tone (Block 88) and waits until the start of the next time slot before removing the hold-off tone and starting to transmit (Block 90). Starting transmissions on time slot boundaries improves the effectiveness with which collisions are prevented. If, before the radio starts to transmit in response to actuation of the key switch, it receives an incoming voice transmission, it does not have to start transmitting. Instead, it can play the received voice signal to the operator's handset. This could prevent the collision that would otherwise have occurred between the incoming and outgoing transmissions.

In this non-limiting example, the slot transmission probabilities, i.e., 'p values', for successive transmission time slots, can be adjusted to compensate for the probability distribution of key switch actuation over time by the radio operator and improve the efficiency with which collisions are avoided. For each transmission time slot $s_n$, a slot transmission probability $p_n$ could be determined from the nominal slot transmission probability "p." Each $p_n$ could be a monotonic function of "p," so that increasing or reducing "p" correspondingly increases or reduces each $p_n$.

It is also possible to adjust the nominal slot transmission probability "p", based on the observed channel utilization. For example, the value of "p" can be increased so as to reduce the mean wait time when channel utilization is low, while reducing the value of "p" and increasing the mean wait time when utilization is high.

It is also possible to adjust the nominal slot transmission probability "p" based on the number of users in the network. This could be based on communications planning information such as the number of stations identified in radio fill information, or based on the number of stations actively transmitting in the network over a recent time period.

The nominal slot transmission probability "p," can also be adjusted based on the amount of time the channel has been occupied by a single transmission or a series of transmissions. Continuous channel occupancy increases the likelihood that multiple voice messages are waiting to be transmitted, and hence could collide once the channel becomes free. The channel could be considered to be "continuously occupied," for this purpose, whenever a sequence of transmissions occupies the channel in which the gaps between successive transmissions are small enough to indicate that each transmission probably started within the persistence interval following the preceding transmission.

The nominal slot transmission probability "p" can also be adjusted based on the slot indices of chosen transmission time slots in past persistence intervals. If the earliest transmission time slots are used, this is an indication that a relatively larger number of users are attempting to seize the channel to deliver traffic whenever the channel becomes free.

The system can infer whether collisions are likely from patterns in the temporal sequence of past transmissions on the channel. For instance, in many systems, a majority of the voice traffic on a radio channel is composed of two-way voice conversations between two stations. Other users listening to the channel can determine that a two-way conversation is taking place, and avoid transmitting so as to prevent collisions. In this circumstance, operators themselves act to prevent collisions, so that the application of p-persistence is unnecessary. In particular, a station participating in such a conversation can so determine in the following way: If the station has recently transmitted, shortly thereafter received precisely one transmission, and is now about to transmit again, it is very probable that the station is participating in a two-way transmission in which collisions are unlikely to occur.

Using this inferred information, the system can determine whether to apply p-persistence on each occasion on which a transmission ends and the channel becomes free. It is also possible to use this inferred information to adjust the nominal slot transmission probability "p" to balance the requirement to avoid collisions in situations in which they would otherwise be likely to occur, against the need to avoid incurring needless overhead from application of p-persistence in situations in which collisions would be unlikely to occur in any case.

A station's role can be used to adjust its nominal slot transmission probability "p" to give it a higher likelihood of successfully transmitting in a persistence interval, when appropriate. In particular, it could be beneficial to give, for example, a military Net Control Station a high nominal slot transmission probability, allowing it to 'seize the channel' by transmitting in an early transmission time slot when it has voice traffic to transmit. This could be beneficial when a network is operated under directed voice procedures, allowing the Net Control Station preferential access to the channel so that it can effectively manage access to the channel by the other net member stations.

The voice information contained in a transmission could be processed to detect and recognize words or other information in the voice traffic, indicating whether or not the situation following the transmission is one in which collisions would be likely to occur. This can be used to determine whether to apply the p-persistence technique as described above. For example, in military voice procedures, ending a transmission with the word "OVER" indicates that a response is expected from a particular user. Ending a transmission with the word "OUT" frequently indicates that no response is expected and any user in the radio network may transmit with new traffic. Only in the latter case would voice transmission collisions be likely to occur. It could be beneficial to apply p-persistence in the latter case but not the former. A radio could analyze the voice payload information to determine whether the last word of the transmission was "OVER" or "OUT." This is a non-limiting example provided only in order to illustrate potential embodiments of the invention.

The system could use a means other than the words "OVER" and "OUT" by which the transmitting operator can indicate whether or not a response from a specific user is expected after the current transmission. For example, the operator could press a switch on the radio whenever he or she transmits a voice transmission containing the word "OUT." The transmitting radio could add a tag, for example, identifiable data, to the voice transmission, identifying it as the final transmission of a voice conversation. Other radios could use the p-persistence to prevent collisions after receiving a voice transmission tagged in this manner. The operator could also release the key switch, then quickly press and release it again to indicate that the channel is being released. These are non-limiting examples provided only in order to illustrate potential embodiments of the invention.

FIG. 14 is a block diagram showing some of the limitations that could be associated with the application of the p-persistence as described. The left hand side of FIG. 14 shows five users as Jason 100, Donald 102, Thomas 104, Lori 106 and Michael 108. The top portion shows how new pending traffic accumulates while a two-way voice conversation occurs. A first persistence interval 110 occurs at a time at which all net users know that Jason will be the next user to transmit. Since a collision is unlikely to occur, the potential delay of Jason's transmission resulting from the persistence interval would merely result in wasted time. Second and third persistence intervals 112, 114 also result in wasted time. A fourth persistence interval 116 is necessary because the conversation between Donald and Jason has just ended, and one or more other users may attempt to initiate conversations at this time. Because new pending traffic (in the form of users wanting to start conversations) has been accumulating for the entire duration of the voice conversation between Donald and Jason, there is an increased likelihood of collisions at this time.

In common voice communications networks such as military and public safety voice communications networks, most network traffic is composed of a series of two-way conversations. In such conversations, based on the trained voice procedures, such as the military voice procedures described by ACP 125 (F) ALLIED COMMUNICATIONS PUBLICATION, COMMUNICATION INSTRUCTIONS, RADIO-TELEPHONE PROCEDURES, Combined Communication Electronics Board (CCEB), September 2001, which is hereby incorporated by reference in its entirety, operators know that the channel is reserved for the next transmission within a conversation. Whenever a persistence interval is applied following a transmission other than the last transmission in a voice conversation, the persistence interval time is wasted. Once a conversation ends, all accumulated traffic is attempted within the ensuing persistence interval. The persistence interval duration may be insufficient to reliably prevent collisions. Unless the system has some way of detecting the boundary between the end of a prior conversation and the start of a new one, extending the last persistence interval would also extend others and result in more waste.

In accordance with a non-limiting example of the present invention, voice communication patterns can be exploited to identify the boundaries of conversations, i.e., the start of each new voice conversation. The p-persistence interval can be applied exclusively or predominantly at these times. The system would determine whether each transmission is the start of a new voice conversation by applying the following rules:

[Rule 1] Any transmission that the transmitting radio system determines to be the start of a new conversation has a data tag attached to it. Radio systems receiving the transmission can detect the tag and interpret the transmission as being the start of a new voice conversation.

[Rule 2] If a transmission $b(1)$ from station B starts at a time following the end of a transmission $a(1)$ by a station A by less than a channel idle timeout threshold such as five seconds, and transmission $a(1)$ contains a start-of-conversation tag, transmission $b(1)$ is determined to not be the start of a new conversation.

[Rule 3] If a station C is about to commence a transmission $c(n)$ following a transmission $b(x)$, and transmission $b(x)$ was preceded by a transmission $c(n-1)$ from the same station C, with the time intervals between $c(n-1)$ and $b(x)$ and between $b(x)$ and $c(n)$ being less than the channel idle timeout threshold, $c(n)$ is determined to not be the start of a new conversation.

[Rule 4] If a station C is about to commence a transmission $c(n)$ following transmissions $a(x)$ and $b(y)$ in the order $a(x)$, $b(y)$, $c(n)$, the time intervals separating $a(x)$ from $b(y)$ and $b(y)$ from $c(n)$ were both less than the channel idle timeout threshold, and $a(x)$ was transmitted by a station A different from C, then transmission $c(n)$ is determined to be the start of a new voice conversation.

[Rule 5] If a station B is about to commence a transmission $b(n)$ following a transmission $a(x)$ by a station A different from B, and the time interval separating transmission $a(x)$ from transmission $b(n)$ is greater than or equal to the channel idle timeout threshold, transmission $b(n)$ is determined to be the start of a new voice conversation.

When these rules are applied, a conversation is considered to end and a new conversation to start whenever the alternation of transmitting stations that occurs in a normal two-way conversation is broken. For example, when a sequence of transmissions of the form A-B-C or A-B-A-B-A-C occurs, the transmission from C is determined to be the start of a new conversation and thus has p-persistence applied to it.

The slot transmission probability p could be dynamically adjusted to make the scheme more efficient. For example, if an early slot such as the first of a persistence interval is used, this indicates that network loading is probably high and the slot transmission probability could be reduced to reduce the likelihood of collision. Conversely, if early slots of a persistence interval are not used, the network loading could be low and the slot transmission probability could be increased to reduce the p-persistence overhead. It is possible to monitor the general network traffic volume and adjust the transmission probability. The length of each conversation could also be monitored. After a long conversation, a lower p value could be used since the likely number of stations contending for the channel is larger. There would be more time for new traffic to arrive.

FIG. 15 is a high-level block diagram showing the application of p-persistence using the intelligent conversation boundary detection in accordance with a non-limiting example of the present invention. At 118, user Donald gets first opportunity to commence a new two-way conversation. A data tag 120 has been appended to the Donald transmission, indicating the start of a new conversation. There is no persistence interval preceding user Jason's transmission because following the start of a new conversation, only the called station will respond and the persistence interval is unnecessary 122. When Donald has transmitted the time before last, he is still part of the conversation. As a result, no persistence interval is required 124. If any other station such as Thomas were to transmit, it would start a new conversation, so a persistence interval is applied 126. Jason is still part of a prior conversation, so no persistence interval is applied to Jason's transmission 128. However, when Lori transmits, her transmission starts a new conversation and hence has a persistence interval applied to it 130.

As shown from FIG. 15, each transmission to which p-persistence is applied is marked as a start of a new conversation and a data tag is attached to the end to the digital voice data as illustrated. The transmission following the start of a conversation has no p-persistence applied. It is a response and the channel is implicitly reserved. Thereafter, no p-persistence is applied as long as the "conversing" stations continue to alternate transmissions. Each break in the alternation is considered the start of a new conversation and the p-persistence is applied. The p-persistence inserts delay only where it is required.

The use of this invention has potential impacts on operator voice procedures in some situations. The system works well whenever conversations follow an A-B-A-B transmission pattern. However, conversations not following the A-B-A-B pattern could be disrupted to some extent.

For example, if the participant that transmits next-to-last in one conversation initiates a second conversation with a different user immediately after the first conversation is completed, resulting in a transmission pattern of the form A-B-A-B followed by A-C, the response to the initiation of a second conversation could have p-persistence applied to it incorrectly. As a result, operator C would not be permitted to transmit immediately (in spite of having the channel reserved, in effect). To avoid this problem, at the end of a conversation, the operator at the station that transmitted next-to-last could wait until a channel is declared idle, for example, wait five seconds, before initiating a conversation with a different station. To assist the operator in doing this, the radio could provide an "idle beep" when the five-second period has elapsed.

For another example, in a conversation such as a round-robin voice check, in which the sequence of transmissions follows the pattern A-B-C-D-E . . . , transmissions C and E may look like the start of a new conversation. Conversations in which voice messages are sent to multiple recipients and acknowledged by each recipient, resulting in transmission patterns such as A-B-C-A-B-C . . . or A-B-C-D-E . . . , could experience similar disruptions.

The impact of the potential disruptions is limited to the possibility that p-persistence could be applied where it should not be applied and not applied where it should be applied. This might cause some communication delays, and diminish the effectiveness of the system in preventing collisions. However, the ability of system users to communicate would not be severely compromised. To avoid the possibility of such disruptions, the operators could turn-off the mechanism when conducting procedures to which it is not suited.

FIG. 16 shows a state diagram for the p-persistent CSMA for digital voice (PPC-DV) protocol behavior. A START 132 is shown with the Channel Idle state 134. A Transmit 136 or Receive 138 state are followed by Post Transmit 140 and Post Receive 142 states as indicated.

FIG. 17 shows an alternate embodiment similar to FIG. 15. FIG. 17 shows the embodiment in which a last node to transmit commences a new conversation. The persistence interval is applied to the transmitting station immediately after its transmission is completed. This permits a station with outgoing traffic to commence sending it immediately after completing a prior two-way conversation, provided that it is given the earliest persistence interval timeslot in which to start transmitting. For example, as illustrated, Jason 100 starts a new conversation with Thomas 104 immediately after finishing his conversation with Donald 102. Donald 102, who transmitted next-to-last in the concluded conversation, must still wait before commencing a new conversation. Otherwise, his transmission will not be marked as starting a new conversation. The response to Donald would be interpreted as starting a new conversation and would suffer unnecessary delay.

As illustrated, at Donald, the data is appended and marked as the start of a new conversation 143. At 144, following the start of a new conversation, only the called station will respond. The persistence interval is unnecessary for anyone but the calling station. As shown at 145, Donald transmitted time before last and is still part of the conversation. Thus, no persistence interval is required. As shown in 146, if any other station were to transmit, it would start a new conversation and the persistence interval is applied corresponding to Thomas. As to Jason and shown at 147, he is still part of the prior conversation. As shown at 148, Jason can start a new conversation during the persistence interval following his prior transmission. As shown at 149, Donald must wait before starting a new conversation to prevent ambiguity.

It is clear that the system and method in accordance with a non-limiting example of the present invention is advantageous. It prevents many potential collisions from occurring at the boundaries of voice conversations by applying p-persistence at those boundaries. It also avoids applying p-persistence at times at which collisions are unlikely to occur, in so doing avoiding unnecessary delays and using channel capacity more efficiently.

This system is applicable to secure digital voice communication for tactical radio systems. It can be used as a replacement for a VHF combat net radio in some applications because it would exploit the increased range made possible by HF propagation characteristics such as a ground wave and NVIS. Comparable network capacity could be provided in spite of the lower voice latency of typical VHF radios using FSK and CVSD. The system and method could be applicable to wireless single-channel media other than HF such as public safety radio systems, for example APCO P25 or TETRA or high-latency digital voice bearers are used.

Figure 18:
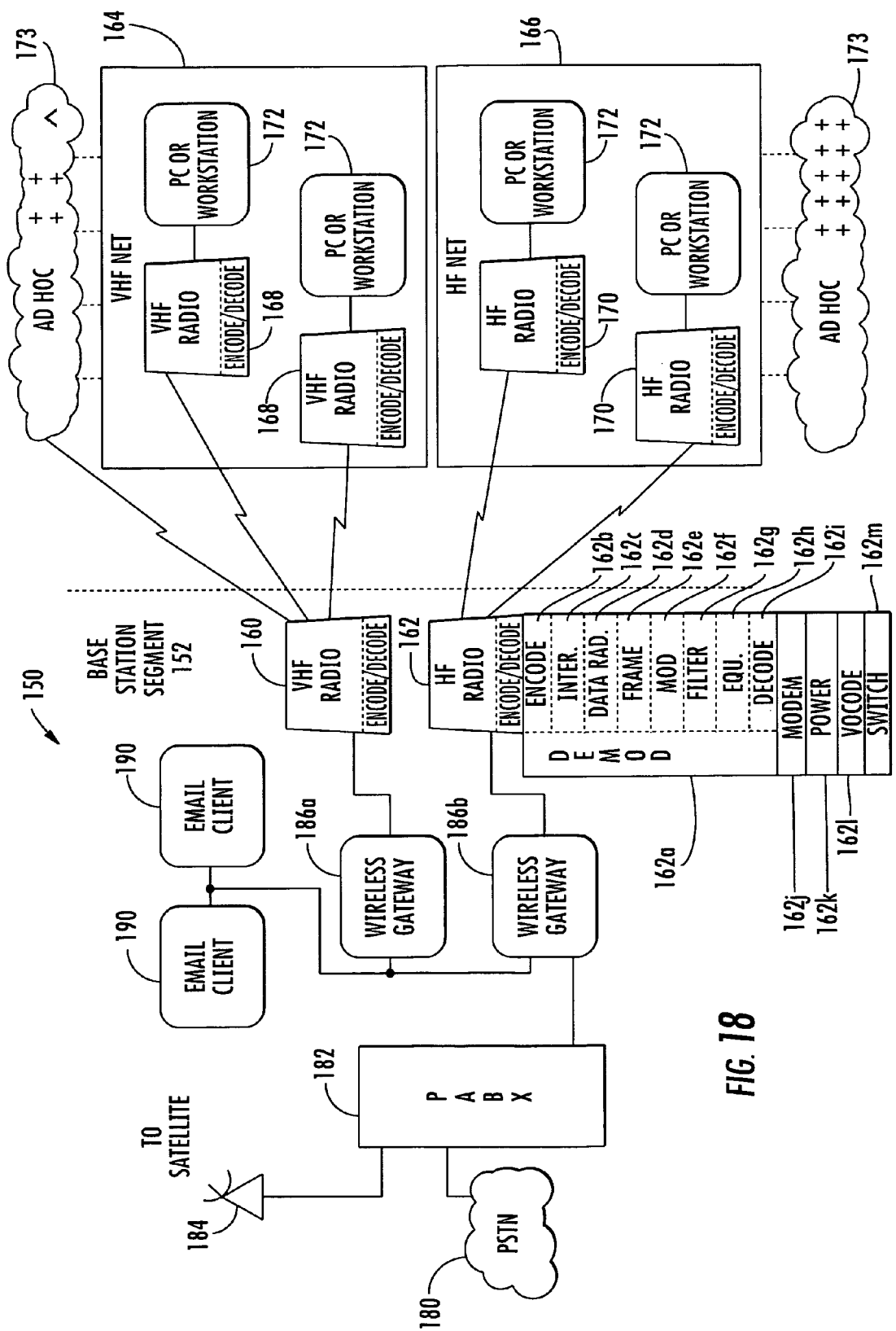
FIG. 18 is a block diagram showing a communications system that can use the p-persistent CSMA and intelligent conversation boundary detection in accordance with a non-limiting example of the present invention.

An example of a communications system that can be modified for use with the present invention is now set forth with regard to FIG. 18.

An example of a radio that could be used with such system and method is a Falcon™ III radio manufactured and sold by Harris Corporation of Melbourne, Fla. It can include a basic transmit switch, and other functional switches and controls known to those skilled in the art. It should be understood that different radios can be used, including but not limited to software defined radios that can be typically implemented with relatively standard processor and hardware components. One particular class of software radio is the Joint Tactical Radio (JTR), which includes relatively standard radio and processing hardware along with any appropriate waveform software modules to implement the communication waveforms a radio will use. JTR radios also use operating system software that conforms with the software communications architecture (SCA) specification (see www.jtrs.saalt.mil), which is hereby incorporated by reference in its entirety. The SCA is an open architecture framework that specifies how hardware and software components are to interoperate so that different manufacturers and developers can readily integrate the respective components into a single device.

The Joint Tactical Radio System (JTRS) Software Component Architecture (SCA) defines a set of interfaces and protocols, often based on the Common Object Request Broker Architecture (CORBA), for implementing a Software Defined Radio (SDR). In part, JTRS and its SCA are used with a family of software re-programmable radios. As such, the SCA is a specific set of rules, methods, and design criteria for implementing software re-programmable digital radios.

The JTRS SCA specification is published by the JTRS Joint Program Office (JPO). The JTRS SCA has been structured to provide for portability of applications software between different JTRS SCA implementations, leverage commercial standards to reduce development cost, reduce development time of new waveforms through the ability to reuse design modules, and build on evolving commercial frameworks and architectures.

The JTRS SCA is not a system specification, as it is intended to be implementation independent, but a set of rules that constrain the design of systems to achieve desired JTRS objectives. The software framework of the JTRS SCA defines the Operating Environment (OE) and specifies the services and interfaces that applications use from that environment. The SCA OE comprises a Core Framework (CF), a CORBA middleware, and an Operating System (OS) based on the Portable Operating System Interface (POSIX) with associated board support packages. The JTRS SCA also provides a building block structure (defined in the API Supplement) for defining application programming interfaces (APIs) between application software components.

The JTRS SCA Core Framework (CF) is an architectural concept defining the essential, "core" set of open software Interfaces and Profiles that provide for the deployment, management, interconnection, and intercommunication of software application components in embedded, distributed-computing communication systems. Interfaces may be defined in the JTRS SCA Specification. However, developers may implement some of them, some may be implemented by non-core applications (i.e., waveforms, etc.), and some may be implemented by hardware device providers.

For purposes of description only, a brief description of an example of a communications system that would benefit from the present invention is described relative to a non-limiting example shown in FIG. 18. This high-level block diagram of a communications system includes a base station segment 152 and wireless message terminals that could be modified for use with the present invention. The base station segment 152 includes a VHF radio 160 and HF radio 162 that communicate and transmit voice or data over a wireless link to a VHF net 164 or HF net 166, each which include a number of respective VHF radios 168 and HF radios 170, and personal computer workstations 172 connected to the radios 168,170. Ad-hoc communication networks 173 are interoperative with the various components as illustrated. Thus, it should be understood that the HF or VHF networks include HF and VHF net segments that are infrastructure-less and operative as the ad-hoc communications network. Although UHF radios and net segments are not illustrated, these could be included.

The HF radio can include a demodulator circuit 162$a$ and appropriate convolutional encoder circuit 162$b$, block interleaver 162$c$, data randomizer circuit 162$d$, data and framing circuit 162$e$, modulation circuit 162$f$, matched filter circuit 162$g$, block or symbol equalizer circuit 162$h$ with an appropriate clamping device, deinterleaver and decoder circuit 162$i$ modem 162$j$, and power adaptation circuit 162$k$ as non-limiting examples. A vocoder circuit 162$l$ can incorporate the decode and encode functions and a conversion unit which could be a combination of the various circuits as described or a separate circuit. A transmit key switch 162$m$ is operative as explained above. These and other circuits operate to perform any functions necessary for the present invention, as well as other functions suggested by those skilled in the art. The circuits referenced here may include any combination of software and/or hardware elements, including but not limited to general purpose microprocessors and associated software, specialized microprocessors for digital signal processing and their associated software, Application Specific Integrated Circuits (ASICs), Field Programmable Gate Arrays (FPGAs), logic circuits, or other kinds of devices and/or software or firmware known to those skilled in the art. Other illustrated radios, including all VHF mobile radios and transmitting and receiving stations can have similar functional circuits.

The base station segment 152 includes a landline connection to a public switched telephone network (PSTN) 180, which connects to a PABX 182. A satellite interface 184, such as a satellite ground station, connects to the PABX 182, which connects to processors forming wireless gateways 186$a$, 186$b$. These interconnect to the VHF radio 160 or HF radio 162, respectively. The processors are connected through a local area network to the PABX 182 and e-mail clients 190. The radios include appropriate signal generators and modulators. The non-packetized digital voice information transmitted within the network using the techniques of the present invention can originate at or be delivered to a handset connected to one of the radios, a telephone or other interface device attached to a wireless gateway device such as the RF-6010 Tactical Network Hub, or a subscriber telephone connected to the PABX or within the public switched telephone network.

An Ethernet/TCP-IP local area network could operate as a "radio" mail server. E-mail messages could be sent over radio links and local air networks using STANAG_5066 as second-generation protocols/waveforms, the disclosure which is hereby incorporated by reference in its entirety and, of course, preferably with the third-generation interoperability standard: STANAG_4538, the disclosure which is hereby incorporated by reference in its entirety. An interoperability standard FED-STD-1052, the disclosure which is hereby incorporated by reference in its entirety, could be used with legacy wireless devices. Examples of equipment that can be used in the present invention include different wireless gateway and radios manufactured by Harris Corporation of Melbourne, Fla. This equipment could include RF5800, 5022, 7210, 5710, 6010, 5285 and PRC 117 and 138 series equipment and devices as non-limiting examples.

These systems can be operable with RF-5710A high-frequency (HF) modems and with the NATO standard known as STANAG 4539, the disclosure which is hereby incorporated by reference in its entirety, which provides for transmission of long distance HF radio circuits at rates up to 9,600 bps. In addition to modem technology, those systems can use wireless email products that use a suite of data-link protocols designed and perfected for stressed tactical channels, such as the STANAG 4538 or STANAG 5066, the disclosures which are hereby incorporated by reference in their entirety. It is also possible to use a fixed, non-adaptive data rate as high as 19,200 bps with a radio set to ISB mode and an HF modem set to a fixed data rate. It is possible to use code combining techniques and ARQ.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A communications system, comprising:
    a plurality of radios that form a carrier sense multiple access (CSMA) wireless communications network and communicate non-packetized digital voice with each other using single channel all-informed communications among the radios;
    each radio being configured to determine the end of conversations in a transmission and to divide the period following the end of a received transmission into a sequence of time slots, and decide randomly or pseudo-randomly with probability p whether to start transmitting on the channel in each of the successive slots based on an estimate whether channel contention is likely.

2. The communications system according to claim 1, wherein a radio is operative to estimate the likelihood of channel contention that could potentially result in a collision of its forthcoming transmission with one or more transmissions by other radios.

3. The communications system according to claim 2, wherein at least one radio decides whether to apply the time slots and the probability p, or to transmit immediately without waiting for a time slot, based on its estimate as to whether channel contention is likely.

4. The communications system according to claim 2, wherein at least one radio adapts the value of the probability p based on its estimate as to whether channel contention is likely.

5. The communications system according to claim 2, wherein a radio is operative to determine whether its own forthcoming transmission is the start of a new voice conversation, and use this determination to estimate whether channel contention is likely.

6. The communications system according to claim 1, and further comprising a data tag attached to a voice transmission from a radio, indicating that the transmission is a start of a new voice conversation.

7. The communications system according to claim 6, wherein said data tag is attached to a collection of digital voice data.

8. The communications system according to claim 1, wherein said radio is operative to start transmitting only if a new transmission has not been detected on the channel prior to the start of the slot.

9. The communications system according to claim 1, wherein each slot in the sequence of slots has a duration at least equal to an effective end-to-end traffic latency which includes some or all of transmit latency, maximum propagation time, and latency of traffic detection by a receiver, so as to permit a transmission commenced in slot n to be detected prior to a start of slot n+1.

10. The communications system according to claim 9, wherein at least one of said radios is operative for inferring whether channel contention is likely from patterns in a temporal sequence of past transmissions on a communications channel.

11. The communications system according to claim 10, wherein in a temporal sequence of transmissions t(1), t(2), . . . t(n) on a communications channel, a radio about to commence transmission t(n) on a channel determines whether or not it was the radio that transmitted transmission t(n−2) on the channel.

12. The communications system according to claim 10, wherein in a temporal sequence of transmissions t(1), t(2), . . . t(n) on a communications channel, a radio about to commence transmission t(n) on a channel determines whether or not the transmission t(n−1) on the channel was the start of a new voice conversation.

13. The communications system according to claim 10, wherein if a radio is about to commence a new voice conversation on a communications channel with a transmission t(n), and the same radio also transmitted a transmission t(n−2) in a prior conversation, the radio waits until the channel is declared idle after it receives transmission t(n−1) before it commences transmission of t(n).

14. The communications system according to claim 13, in which the radio provides an indication to the radio operator when the channel is declared idle, so that the operator can delay initiating the first transmission t(n) of a new voice conversation until after the channel is declared idle.

15. A method for communicating digital voice data, which comprises:
    receiving within a radio a non-packetized digital voice communications signal over a carrier sense multiple access (CSMA) wireless communications channel as a single channel, all-informed communications among a plurality of radios in a CSMA wireless communications network;
    determining the ends of conversations in a transmission and dividing the period following the end of a received transmission into a sequence of time slots; and
    deciding randomly or pseudo-randomly with probability p whether to start transmitting on the channel in each of the successive slots based on an estimate whether channel contention is likely.

16. The method according to claim 15, which further comprises estimating the likelihood of channel contention that could potentially result in a collision of a radio's forthcoming transmission with one or more transmissions by other radios.

17. The method according to claim 16, which further comprises deciding at a radio whether to apply the time slots and probability p or to transmit immediately without waiting for a time slot, based on its estimate as to whether channel contention is likely.

18. The method according to claim 16, which further comprises adapting the value of probability p based on the radio's estimate as to whether channel contention is likely.

19. The method according to claim 16, which further comprises determining whether a forthcoming transmission is the start of a new voice conversation and using this determination to estimate whether channel contention is likely.

20. The method according to claim 15, which further comprises attaching a data tag to a voice transmission from a radio, indicating that the transmission is a start of a new voice conversation.

21. The method according to claim 20, which further comprises attaching the data tag to a collection of digital voice data.

22. The method according to claim 16, which further comprises inferring whether channel contention is likely from patterns in a temporal sequence of past transmissions on a communications channel.

23. The method according to claim 22, which further comprises determining at a radio about to commence transmission t(n) on a channel within a temporal sequence of transmissions t(1), t(2), . . . t(n) that it was the same radio that transmitted transmission t(n−2) on the channel.

24. The method according to claim 23, which further comprises determining at a radio about to commence transmission t(n) on a channel within a temporal sequence of transmissions t(1), t(2), . . . t(n) that transmission t(n−1) on the channel was the start of a new voice conversation.

25. A communications system, comprising:
a plurality of radios that form a carrier sense multiple access (CSMA) wireless communications network and communicate non-packetized digital voice with each other using single channel all-informed communications among the radios;
each radio being operative for dividing a period following the end of a received transmission into a sequence of time slots, and deciding randomly or pseudo-randomly with probability p whether to start transmitting on the channel in each of the successive slots, wherein a radio is operative to estimate the likelihood of channel contention that could potentially result in a collision of its forthcoming transmission with one or more transmissions by other radios, and wherein at least one radio decides whether to apply the time slots and the probability p, or to transmit immediately without waiting for a time slot, based on its estimate as to whether channel contention is likely.

26. A communications system, comprising:
a plurality of radios that form a carrier sense multiple access (CSMA) wireless communications network and communicate non-packetized digital voice with each other using single channel all-informed communications among the radios;
each radio being operative for dividing a period following the end of a received transmission into a sequence of time slots, and deciding randomly or pseudo-randomly with probability p whether to start transmitting on the channel in each of the successive slots, wherein a radio is operative to estimate the likelihood of channel contention that could potentially result in a collision of its forthcoming transmission with one or more transmissions by other radios, and at least one radio adapts the value of the probability p based on its estimate as to whether channel contention is likely.

27. A communications system, comprising:
a plurality of radios that form a carrier sense multiple access (CSMA) wireless communications network and communicate non-packetized digital voice with each other using single channel all-informed communications among the radios;
each radio being operative for dividing a period following the end of a received transmission into a sequence of time slots, and deciding randomly or pseudo-randomly with probability p whether to start transmitting on the channel in each of the successive slots, and wherein a radio is operative to estimate the likelihood of channel contention that could potentially result in a collision of its forthcoming transmission with one or more transmissions by other radios, and a radio is operative to determine whether its own forthcoming transmission is the start of a new voice conversation, and use this determination to estimate whether channel contention is likely.

28. A communications system, comprising:
a plurality of radios that form a carrier sense multiple access (CSMA) wireless communications network and communicate non-packetized digital voice with each other using single channel all-informed communications among the radios;
each radio being operative for dividing a period following the end of a received transmission into a sequence of time slots, and deciding randomly or pseudo-randomly with probability p whether to start transmitting on the channel in each of the successive slots, and wherein each slot in the sequence of slots has a duration at least equal to an effective end-to-end traffic latency which includes some or all of transmit latency, maximum propagation time, and latency of traffic detection by a receiver, so as to permit a transmission commenced in slot n to be detected prior to a start of slot n+1, and at least one of said radios is operative for inferring whether channel contention is likely from patterns in a temporal sequence of past transmissions on a communications channel.

29. A method for communicating digital voice data, which comprises:
receiving within a radio a non-packetized digital voice communications signal over a carrier sense multiple access (CSMA) wireless communications channel as a single channel, all-informed communications among a plurality of radios in a CSMA wireless communications network;
determining the ends of conversations in a transmission and dividing the period following the end of a received transmission into a sequence of time slots;
deciding randomly or pseudo-randomly with probability p whether to start transmitting on the channel in each of the successive slots based on an estimate whether channel contention is likely;
estimating the likelihood of channel contention that could potentially result in a collision of a radio's forthcoming transmission with one or more transmissions by other radios; and
deciding at a radio whether to apply the time slots and probability p or to transmit immediately without waiting for a time slot, based on its estimate as to whether channel contention is likely.

30. A method for communicating digital voice data, which comprises:
receiving within a radio a non-packetized digital voice communications signal over a carrier sense multiple access (CSMA) wireless communications channel as a single channel, all-informed communications among a plurality of radios in a CSMA wireless communications network;
determining the ends of conversations in a transmission and dividing the period following the end of a received transmission into a sequence of time slots;
deciding randomly or pseudo-randomly with probability p whether to start transmitting on the channel in each of the successive slots based on an estimate whether channel contention is likely;
estimating the likelihood of channel contention that could potentially result in a collision of a radio's forthcoming transmission with one or more transmissions by other radios; and adapting the value of probability p based on the radio's estimate as to whether channel contention is likely.

31. A method for communicating digital voice data, which comprises:
receiving within a radio a non-packetized digital voice communications signal over a carrier sense multiple access (CSMA) wireless communications channel as a single channel, all-informed communications among a plurality of radios in a CSMA wireless communications network;
determining the ends of conversations in a transmission and dividing the period following the end of a received transmission into a sequence of time slots;
deciding randomly or pseudo-randomly with probability p whether to start transmitting on the channel in each of the successive slots based on an estimate whether channel contention is likely;
estimating the likelihood of channel contention that could potentially result in a collision of a radio's forthcoming transmission with one or more transmissions by other radios; and
determining whether a forthcoming transmission is the start of a new voice conversation and using this determination to estimate whether channel contention is likely.

32. A method for communicating digital voice data, which comprises:
receiving within a radio a non-packetized digital voice communications signal over a carrier sense multiple access (CSMA) wireless communications channel as a single channel, all-informed communications among a plurality of radios in a CSMA wireless communications network;
determining the ends of conversations in a transmission and dividing the period following the end of a received transmission into a sequence of time slots;
deciding randomly or pseudo-randomly with probability p whether to start transmitting on the channel in each of the successive slots based on an estimate whether channel contention is likely;
estimating the likelihood of channel contention that could potentially result in a collision of a radio's forthcoming transmission with one or more transmissions by other radios;
inferring whether channel contention is likely from patterns in a temporal sequence of past transmissions on a communications channel; and
determining at a radio about to commence transmission $t(n)$ on a channel within a temporal sequence of transmissions $t(1), t(2), \ldots t(n)$ that it was the same radio that transmitted transmission $t(n-2)$ on the channel.

* * * * *